(12) United States Patent
Wu et al.

(10) Patent No.: US 10,834,601 B2
(45) Date of Patent: Nov. 10, 2020

(54) SIGNAL TRANSMISSION METHOD, TERMINAL DEVICE, ACCESS NETWORK DEVICE, AND TRANSMISSION SYSTEM FOR SIGNAL TRANSMISSION ON AN UNLICENSED SPECTRUM RESOURCE

(71) Applicant: HUAWEI TECHNOLOGIES CO., LTD., Guangdong (CN)

(72) Inventors: Zuomin Wu, Shenzhen (CN); Lei Guan, Beijing (CN); Sha Ma, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 60 days.

(21) Appl. No.: 16/147,163

(22) Filed: Sep. 28, 2018

(65) Prior Publication Data
US 2019/0037411 A1 Jan. 31, 2019

Related U.S. Application Data

(63) Continuation of application No. PCT/CN2016/078152, filed on Mar. 31, 2016.

(51) Int. Cl.
*H04W 16/14* (2009.01)
*H04W 74/08* (2009.01)
(Continued)

(52) U.S. Cl.
CPC ........... *H04W 16/14* (2013.01); *H04W 28/08* (2013.01); *H04W 72/1215* (2013.01); *H04W 74/08* (2013.01)

(58) Field of Classification Search
CPC . H04W 16/14; H04W 28/08; H04W 72/1215; H04W 74/08
See application file for complete search history.

(56) References Cited

U.S. PATENT DOCUMENTS

| 2013/0315152 A1 | 11/2013 | Ratasuk et al. |
| 2015/0271847 A1 | 9/2015 | Luo et al. |

(Continued)

FOREIGN PATENT DOCUMENTS

| CN | 103458520 A | 12/2013 |
| CN | 104796232 A | 7/2015 |

(Continued)

OTHER PUBLICATIONS

3GPP TS 36.211 V13.1.0 (Mar. 2016),3rd Generation Partnership Project;Technical Specification Group Radio Access Network;Evolved Universal Terrestrial Radio Access (E-UTRA);Physical channels and modulation(Release 13),dated Mar. 29, 2016,total 155 pages.

*Primary Examiner* — Jackie Zuniga Abad
(74) *Attorney, Agent, or Firm* — Womble Bond Dickinson (US) LLP

(57) ABSTRACT

Embodiments of this application disclose a signal transmission method, a terminal device, and an access network device, to increase a probability of sending a signal on an unlicensed spectrum resource. The method may include determining, by a terminal device, that permission to use a channel is obtained at any time point within a time window, a start time point of the time window is a start time point of a symbol, an end time point of the time window is a second time point, the second time point is within a time occupied by the symbol, a signal includes at least an actual cyclic prefix and an information segment, duration of the actual cyclic prefix is less than or equal to a time length between the start time point of the symbol and the second time point. The method may also include sending, by the terminal device, the signal from the first time point.

19 Claims, 9 Drawing Sheets

(51) Int. Cl.
*H04W 28/08* (2009.01)
*H04W 72/12* (2009.01)

(56) References Cited

U.S. PATENT DOCUMENTS

| | | |
|---|---|---|
| 2015/0296385 A1 | 10/2015 | Zhang et al. |
| 2016/0007322 A1 | 1/2016 | Agardh et al. |
| 2017/0111889 A1* | 4/2017 | Li .................. H04W 74/08 |
| 2017/0231013 A1 | 8/2017 | Ahn et al. |
| 2017/0244586 A1* | 8/2017 | Yoo .................. H04L 27/2607 |

FOREIGN PATENT DOCUMENTS

| | | |
|---|---|---|
| CN | 105101223 A | 11/2015 |
| CN | 105323858 A | 2/2016 |
| WO | 2013126858 A1 | 8/2013 |
| WO | 2015054294 A2 | 4/2015 |
| WO | 2015169359 A1 | 11/2015 |
| WO | 2016021945 A1 | 2/2016 |

* cited by examiner

SIGNAL TRANSMISSION METHOD, TERMINAL DEVICE, ACCESS NETWORK DEVICE, AND TRANSMISSION SYSTEM FOR SIGNAL TRANSMISSION ON AN UNLICENSED SPECTRUM RESOURCE

CROSS-REFERENCE TO RELATED APPLICATIONS

This application is a continuation of International Application No. PCT/CN2016/078152, filed on Mar. 31, 2016, the disclosure of which is hereby incorporated by reference in its entirety.

TECHNICAL FIELD

The present invention relates to the field of communications technologies, and in particular, to a signal transmission method, a terminal device, an access network device, and a signal transmission system.

BACKGROUND

In an existing Long Term Evolution (LTE) system, a spectrum resource used by an operator is mainly a licensed spectrum resource. As a quantity of users of a mobile communications network increases and users impose higher requirements on a communication rate and quality of service, operators start to cast their eyes over unlicensed spectrum resources, and expect to implement network capacity offloading and improve quality of service by using the unlicensed spectrum resources. For example, in an existing licensed-assisted access using LTE (LAA-LTE) system and an evolved system thereof, configuration and a structure of carrier aggregation (CA) in an existing LTE system is used, communication on a carrier in a licensed spectrum of an operator is used as a basis, a plurality of carriers in an unlicensed spectrum are configured, and a licensed carrier is used as assistance, to perform communication on unlicensed carriers, so that network capacity offloading is implemented by using an unlicensed spectrum resource, and further, load on the licensed carrier is reduced.

During use of an unlicensed spectrum resource, a problem first needing to be resolved is resource contention. A resource contention method used in the existing LAA-LTE system is referred to as listen before talk (LBT). A basic idea of LBT is as follows: Before sending a signal on a channel, each communications device first needs to detect whether a current channel is idle, in other words, whether it can be detected that a nearby node is sending a signal on the channel. This detection process is referred to as clear channel assessment (CCA). If detecting, within a time period, that the channel is idle, the communications device may send the signal; or if detecting that the channel is occupied, the communications device currently cannot send the signal.

When the contention method LBT is applied to the LAA-LTE communications system or a similar communications system, a new problem may occur. Using the LAA-LTE system as an example, the LAA-LTE system inherits a frame structure in an LTE system, the frame structure is relatively fixed, and a frame boundary, a subframe boundary, or a symbol boundary is fixed temporally. In other words, for an LAA-LTE system, a frame boundary, a subframe boundary, or a symbol boundary corresponds to a determined time point temporally. A signal is sent only from the time point corresponding to the subframe boundary or the symbol boundary. If an LBT detection result of a communications device is that a channel is occupied at a predefined signal send time point, the communications device cannot send a signal on the channel at the predefined signal send time point. As a result, when a signal is sent on a channel in an unlicensed spectrum, a sending probability of the signal is relatively small.

SUMMARY

Embodiments of the present invention provide a signal transmission method, a terminal device, an access network device, and a signal transmission system, so that when a signal is sent on an unlicensed spectrum resource, a send time point of the signal is not limited to a symbol boundary, the signal can instead be sent at any time point in a time period. Therefore, the embodiments increase a probability of sending a signal on the unlicensed spectrum resource.

In view of this, according to a first aspect, an embodiment of this application provides a signal transmission method. A specific working process is described as follows:

determining, by a terminal device, whether permission to use a channel in an unlicensed spectrum is obtained at any time point in a time window, where a start time point of the time window is a start time point of a symbol or is not later than the start time point of the symbol, an end time point of the time window is a second time point or is not later than the second time point, the second time point is within a time occupied by the symbol, the symbol is used to send a signal including at least an actual cyclic prefix and an information segment, the actual cyclic prefix and the information segment are temporally continuous, the actual cyclic prefix is prior to the information segment, duration of the actual cyclic prefix is less than or equal to first duration of a preset cyclic prefix, and the first duration is a time length between the start time point of the symbol and the second time point; and sending, by the terminal device, the signal from the first time point.

As can be learned from the foregoing descriptions, in this embodiment of this application, when the permission to use a channel on an unlicensed spectrum resource is obtained, when a signal is sent on a channel in an unlicensed spectrum on the unlicensed spectrum resource, a send time point of the signal is not limited to a symbol boundary. Instead, the signal can be sent at any time point in a time period, which in this embodiment increases a probability of sending a signal on the channel in the unlicensed spectrum on the unlicensed spectrum resource.

In an embodiment of a possible design, the duration of the actual cyclic prefix of the signal is less than the first duration; and the sending, by the terminal device, the signal from the first time point includes:

sending, by the terminal device, the actual cyclic prefix of the signal from the first time point to the second time point; and sending, by the terminal device, the information segment of the signal from the second time point.

In this embodiment of this application, on one hand, a specific manner of sending the signal from the first time point is provided, providing practicability of the solution. In other words, the terminal device can send, within a time period from the first time point to the second time point, a cyclic prefix that is of a signal and whose time length is less than the preset cyclic prefix. The cyclic prefix is the actual cyclic prefix. The terminal device sends an information segment part of the signal from the second time point.

In an embodiment of a possible design, it needs to be ensured that the duration of the actual cyclic prefix is greater than or equal to the second duration.

Preferably, in an embodiment of an actual application, considering that a main function of a cyclic prefix is to overcome an impact that is caused by a round-trip time of signal transmission and multipath interference during signal transmission to signal demodulation performance, the second duration is greater than or equal to a sum of maximum round-trip duration of signal transmission between the terminal device and an access network device and a maximum channel delay spread.

Optionally, considering that the second duration may be determined uniformly for all users in a cell, the second duration is greater than or equal to a sum of maximum round-trip duration of signal transmission between an edge user in a cell of the terminal device and an access network device and a maximum possible channel delay spread.

As can be learned from the foregoing descriptions, in this embodiment of this application, it is ensured that duration of a cyclic prefix of a sent signal is greater than the sum of the maximum round-trip duration of signal transmission between the terminal device and the access network device and the maximum channel delay spread. In an actual application, the impact caused by the round-trip time of signal transmission and the multipath interference during signal transmission to the signal demodulation performance is overcome, thereby ensuring practicability of the technical solution of this embodiment of this application. Further, the second duration is specifically greater than or equal to a sum of maximum round-trip duration of signal transmission between a terminal device on a cell edge and the access network device and the maximum possible channel delay spread, and the second duration is configured by using the terminal device on the cell edge as a reference, thereby ensuring that the terminal device can successfully send a signal.

In an embodiment of a possible design, before the terminal device obtains the permission to use the channel in the unlicensed spectrum, preferably, the terminal device may determine the second duration based on indication information sent by the access network device.

Optionally, the second duration is determined based on predefined configuration of the terminal device itself.

In this embodiment of this application, two manners of determining the second duration are provided, thereby increasing variety and practicability of this embodiment of this application.

In an embodiment of a possible design, the duration of the actual cyclic prefix is equal to the first duration;

the symbol includes guard duration; and the end time point of the time window is not later than the second time point, duration between the start time point of the symbol and the end time point of the time window is equal to third duration, and the third duration is less than smaller duration in the first duration and the guard duration.

In other words, as can be learned from the foregoing descriptions, in this embodiment of this application, it is allowed in this design that when the terminal device sends a signal, a send time-domain resource is delayed compared with a preset send time-domain resource. However, an excessively long delayed time not only affects demodulation performed by the access network device on the transmitted signal, but also affects transmission of a signal following the signal. Therefore, limitation is imposed in such a way that the duration between the start time point of the symbol and the end time point of the time window is equal to the third duration. In other words, in this manner, it is allowed that a maximum delayed time when the terminal device sends the signal is the third duration, and the third duration is less than the duration of the preset cyclic prefix. In other words, in this embodiment of this application, a signal sending opportunity is increased, and at the same time, an impact caused by the increase in the signal sending opportunity to a result of demodulating, by the access network device, a signal is reduced.

With reference to the foregoing embodiment, in an embodiment of a possible design, the terminal device may determine information about duration between the start time point of the symbol and the first time point, and report the determined duration information to the access network device.

In this embodiment of this application, the access network device may subtract the delayed duration when estimating the round-trip transmission time, in other words, a timing advance (TA), of the terminal device, to obtain actual TA information of the terminal device, and send the obtained TA information to the terminal device. The terminal device can obtain a timing advance from which the delayed duration is subtracted, and perform uplink signal transmission based on the timing advance, thereby reducing an impact caused by delayed sending.

It should be noted that optionally, the terminal device may not report the information about the duration between the first time point at which signal sending is delayed and the start time point of the symbol to the access network device, but subtracts the delayed duration from duration obtained from received TA information sent by the access network device, to obtain actual TA information of the terminal device. Subsequently, the terminal device may perform uplink signal transmission based on the actual timing information, thereby reducing an impact caused by delayed sending.

In an embodiment of a possible design, before the terminal device determines that the permission to use the channel in the unlicensed spectrum is obtained at the first time point, the terminal device may determine the third duration based on indication information sent by an access network device or predefined configuration.

In this embodiment of this application, two manners of determining the third duration are provided, thereby increasing variety and practicability of this embodiment of this application.

In an embodiment of a possible design, before the terminal device determines that the permission to use the channel in the unlicensed spectrum is obtained at the first time point, the terminal device may determine at least one piece of the following information based on the indication information sent by the access network device or the predefined configuration:

a length of the time window;
the start time point of the time window;
the end time point of the time window;
the start time point of the symbol;
the second time point; and
the first duration.

In other words, in this embodiment of this application, the terminal device may determine the information such as the length of the time window in a plurality of manners, to determine the practicability and variety of the solution.

In an embodiment of a possible design, the signal in the foregoing solution may be a physical random access preamble sequence in a Long Term Evolution LTE system; and further, a format of the physical random access preamble sequence may be specifically format 0; or format 1; or format 2; or format 3; or format 4.

In the signal transmission method in this embodiment of this application, the signal may be specifically the physical random access preamble sequence. By using the signal transmission method in the foregoing embodiment, when a random access preamble sequence is sent on a channel in an unlicensed spectrum on an unlicensed spectrum resource, a send time point of the random access preamble sequence is not limited to a frame boundary, a subframe boundary, or a symbol boundary, instead, the random access preamble sequence can be sent at any time point in a time period. This embodiment increases an opportunity of sending a random access preamble sequence. In other words, a sequence access opportunity is increased when a random access preamble sequence is sent on a channel in an unlicensed spectrum on an unlicensed spectrum resource.

According to a second aspect, an embodiment of this application provides a signal transmission method. Details are described as follows:

determining, by an access network device, indication information, where the indication information includes at least one of length information of a time window, start time point information of the time window, end time point information of the time window, start time point information of a symbol, second time point information, and first duration information; and sending, by the access network device, the indication information to a terminal device, so that the terminal device determines the time window, the start time point information of the symbol, a second time point, or a preset cyclic prefix based on the indication information.

In this embodiment of this application, the access network device may send the indication information to the terminal device, so that the terminal device determines the time window, the start time point information of the symbol, the second time point, or the preset cyclic prefix based on the indication information.

In an embodiment of a possible design, the indication information further includes second duration information or third duration information.

According to a third aspect, an embodiment of this application provides a signal transmission method. Details are described as follows:

determining, by an access network device, a first set, where the first set includes at least two preset start time points for signal transmission in one subframe;

determining, by the access network device, a first resource and a second resource, where the first resource and the second resource are different frequency-domain resources, start time points of the first resource and the second resource in a time domain are both a first time point, and the first time point is a time point in the first set; and sending, by the access network device, information including the first resource to a first terminal device, and sending, by the access network device, information including the second resource to a second terminal device, where the first resource is used to transmit a first signal, and the second resource is used to transmit a second signal.

In an embodiment of a possible design, the first signal is a physical random access preamble sequence, and the second signal is a sounding reference signal.

According to a fourth aspect, an embodiment of this application provides a signal transmission method. Details are described as follows:

receiving, by a first terminal device, information including a first resource;

receiving, by a second terminal device, information including a second resource, where the first resource and the second resource are different frequency-domain resources, start time points of the first resource and the second resource in a time domain are both a first time point, the first time point is a time point in a first set, and the first set includes at least two preset start time points for signal transmission in one subframe; and sending, by the first terminal device, a first signal in the first resource from the first time point, and sending, by the second terminal device, a second signal in the second resource from the first time point.

In an embodiment of a possible design, the first signal is a physical random access preamble sequence, and the second signal is a sounding reference signal.

According to a fifth aspect, an embodiment of this application provides a terminal device. The terminal device has a function of implementing actions of the terminal device in the foregoing method design. The function may be implemented by hardware, or may be implemented by hardware executing corresponding software. The hardware or software includes one or more modules corresponding to the foregoing function. The module may be software and/or hardware.

In an embodiment of a possible design, the terminal device includes:

a processing module, configured to determine that permission to use a channel in an unlicensed spectrum is obtained at a first time point, where the first time point is any time point within a time window, where a start time point of the time window is a start time point of a symbol or is prior to the start time point of the symbol, an end time point of the time window is a second time point or is prior to the second time point, the second time point is within a time occupied by the symbol, the symbol is a symbol used to send a signal, the signal includes at least an actual cyclic prefix and an information segment, the actual cyclic prefix and the information segment are temporally continuous, the actual cyclic prefix is prior to the information segment, duration of the actual cyclic prefix is less than or equal to first duration of a preset cyclic prefix, and the first duration is a time length between the start time point of the symbol and the second time point; and a sending module, configured to send the signal from the first time point.

In an embodiment of a possible design, a structure of the terminal device includes a processor and a transmitter. The processor is configured to determine that permission to use a channel in an unlicensed spectrum is obtained at a first time point, where the first time point is any time point within a time window, where a start time point of the time window is a start time point of a symbol or is prior to the start time point of the symbol, an end time point of the time window is a second time point or is prior to the second time point, the second time point is within a time occupied by the symbol, the symbol is a symbol used to send a signal, the signal includes at least an actual cyclic prefix and an information segment, the actual cyclic prefix and the information segment are temporally continuous, the actual cyclic prefix is prior to the information segment, duration of the actual cyclic prefix is less than or equal to first duration of a preset cyclic prefix, and the first duration is a time length between the start time point of the symbol and the second time point; and the transmitter is configured to send the signal from the first time point.

According to a sixth aspect, an embodiment of this application provides an access network device. The access network device has a function of implementing actions of the access network device in the foregoing method design. The function may be implemented by hardware, or may be implemented by hardware executing corresponding software. The hardware or software includes one or more modules corresponding to the foregoing function. The module may be software and/or hardware.

In an embodiment of a possible design, the access network device includes:

a determining module, configured to determine indication information, where the indication information includes at least one of length information of a time window, start time point information of the time window, end time point information of the time window, start time point information of a symbol, second time point information, and first duration information; and a sending module, configured to send the indication information to a terminal device, so that the terminal device determines the time window, the start time point information of the symbol, a second time point, or a preset cyclic prefix based on the indication information.

In an embodiment of a possible design, a structure of the access network device includes a processor and a transmitter. The processor is configured to determine the indication information. The transmitter is configured to send the indication information to the terminal device.

According to a seventh aspect, an embodiment of this application provides a signal transmission system. The signal transmission system includes a first terminal device, a second terminal device, and an access network device. The access network device in the signal transmission system has a function of implementing actions of the access network device in the method design in the third aspect. The function may be implemented by hardware, or may be implemented by hardware executing corresponding software. The hardware or software includes one or more modules corresponding to the foregoing function. The module may be software and/or hardware. Similarly, the first terminal device and the second terminal device have functions of implementing actions of the first terminal device and the second terminal device in the method design in the fourth aspect.

According to an eighth aspect, an embodiment of this application provides a computer storage medium. The computer storage medium stores program code, and the program code is used to instruct to perform the method in the first aspect, the second aspect, the third aspect, or the fourth aspect.

As can be learned from the foregoing technical solutions, in the embodiments of this application, the terminal device obtains the permission to use the channel in the unlicensed spectrum at the first time point. The first time point is any time point in a segment of a time window. A start time point of the time window is a start time point of a symbol or is prior to the start time point of the symbol, an end time point of the time window is a second time point or is prior to the second time point, the second time point is within a time occupied by the symbol, the symbol is a symbol used to send the signal, the signal includes at least the actual cyclic prefix and the information segment, the actual cyclic prefix and the information segment are temporally continuous, and the actual cyclic prefix of the signal is temporally prior to the information segment. In addition, the duration of the actual cyclic prefix of the signal is less than or equal to the first duration of the preset cyclic prefix, and the first duration is a time length between the start time point of the symbol and the second time point. The terminal device sends a sequence from the first time point. In other words, in this application, when a signal is sent on a channel in an unlicensed spectrum on an unlicensed spectrum resource, a send time point of the signal is not limited to a symbol boundary, instead, the signal can be sent at any time point in a time period, so that this embodiment increases a probability of sending a signal on the unlicensed spectrum resource.

DESCRIPTION OF EMBODIMENTS

Figure 1:
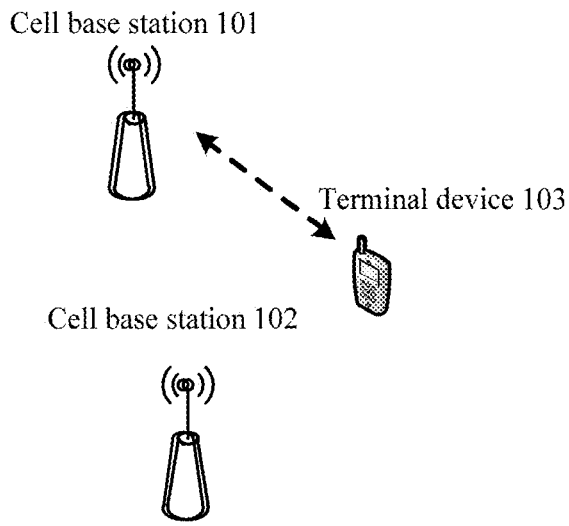
FIG. 1 is a schematic diagram of a system architecture according to an embodiment of this application.

Embodiments of the present invention provide a signal transmission method, a terminal device, an access network device, and a signal transmission system, to resolve a problem that when a signal is sent on an unlicensed spectrum resource, a signal sending probability is relatively small.

To make persons skilled in the art understand the technical solutions in this application better, the following clearly describes the technical solutions in the embodiments of this application with reference to the accompanying drawings in the embodiments of this application. Apparently, the described embodiments are merely a part rather than all of the embodiments of this application. All other embodiments obtained by persons of ordinary skill in the art based on the embodiments of this application without creative efforts shall fall within the protection scope of this application.

It should be understood that when transmission is performed on an unlicensed spectrum resource in an LTE system, the LTE system may be considered as an unlicensed Long Term Evolution (U-LTE) system. U-LTE generally refers to all LTE systems using an unlicensed spectrum and evolved systems thereof. Particularly, there may be the following two cases. In the first case, transmission on a carrier on an unlicensed spectrum resource is assisted by a carrier in a licensed spectrum. For example, the system is a licensed-assisted access using LTE system and an evolved system thereof. In the LAA-LTE system, configuration and a structure of carrier aggregation in an existing LTE system are mainly used, communication on a carrier in a licensed spectrum of an operator is used as a basis, a plurality of carriers in an unlicensed spectrum are configured, and a licensed carrier is used as assistance, to perform communication on unlicensed carriers, so that network capacity offloading can be implemented by using the unlicensed spectrum resource, and load of the licensed carrier is further reduced. In the second case, transmission on a carrier on an unlicensed spectrum resource is not assisted by a carrier in a licensed spectrum. For example, the system is a stand-alone LTE (SA-LTE) system and an evolved system thereof. A difference between the SA-LTE system and the LAA-LTE system is that in the LAA-LTE system, only a data channel is offloaded to an unlicensed carrier, and initial access and obtaining of a system common message still are implemented on a licensed carrier, while in the SA-LTE system, no licensed carrier assists access, and as a result, all interaction processes between a network device and user equipment need to be implemented on an unlicensed carrier.

The technical solutions of the embodiments of this application may be applied to various communications systems in a wireless cellular network, for example, a Global System for Mobile Communications (GSM) system, a Code Division Multiple Access (CDMA) system, a Wideband Code Division Multiple Access (WCDMA) system, a general packet radio service (GPRS) system, an LTE system, a Universal Mobile Telecommunications System (UMTS), or a future 5G communications system. This is not limited in this application.

The technical solutions of the embodiments of this application are mainly applied to the LTE system and the evolved system thereof, and particularly, applied to the LAA-LTE system or the SA-LTE system. Network elements in a communications system to which the embodiments of the present invention are applied are an access network device (also referred to as a network device) and a terminal device (also referred to as user equipment). The technical solutions of the embodiments of this application may also be applied to another similar communications system including a fixed subframe boundary or symbol boundary and having a resource contention requirement. This is not limited in this application.

It should be understood that in the technical solutions of the embodiments of this application, one symbol includes at least a cyclic prefix (CP) part and an information segment part. The information segment part includes all information of the symbol. The CP repeats a part of the information segment of the signal. In the technical solutions in the embodiments of this application, the symbol may be an Orthogonal Frequency Division Multiplex (OFDM) symbol in the LTE system, or may be a single carrier-Frequency Division Multiple Access (SC-FDMA) symbol in the LTE system, or may be a symbol occupied by a random access preamble sequence in the LTE system. In the technical solutions in the embodiments of this application, the symbol may be another type of communication symbol. This is not limited in this application.

It should be understood that in the embodiments of this application, a communications system in which a base station and a terminal device are located is a communications system including a predefined or fixed subframe start time point, subframe end time point, symbol start time point, and symbol end time point. In this communications system, time is divided by a fixed time unit. In other words, when a granularity of a time unit and a start time point and an end time point of the time unit are determined, start time points and end time points of previous and following time units can be known. In the embodiments of this application, subframe boundary is a start time point of a subframe or an end time point of a subframe, a symbol boundary is a start time point or an end time point of a symbol, a start time point of a subframe is equivalent to an end time point of a preceding subframe, and a start time point of a symbol is equivalent to an end time point of a preceding symbol. Assuming that a first time period and a second time period are temporally continuous and the first time period is prior to the second time period, it may be considered that an end time point of the first time period is equivalent to a start time point of the second time period.

Referring to FIG. 1, FIG. 1 shows an application scenario to which the solutions proposed in this application may be applied. The scenario includes a cell base station 101, a cell base station 102 neighboring to the cell base station 101, and a terminal device 103 located in coverage of the cell base station 101 and communicating with the cell base station 101. The cell base station 101 and the terminal device 103 are specifically communications devices that support communication performed by using an unlicensed spectrum resource and that have fixed frame boundaries, subframe boundaries, or symbol boundaries. A frequency band supported by the cell base station 102 may be the same as that supported by the cell base station 101. The cell base station 102 and the cell base station 101 may be a same type of communications devices, or may be different types of communications devices. For example, the cell base station 101 may be a base station in an LTE system, and the corresponding terminal device 103 may be a terminal device in the LTE system. The cell base station 102 may also be a base station in an LTE system, or may be a wireless router, a wireless repeater, or a terminal device in a Wi-Fi system. This is not specifically limited herein.

In the embodiments of this application, the terminal device may also be referred to as user equipment (UE), a mobile station (English full name: Mobile Station, English acronym: MS), a mobile terminal, or the like. The terminal device may communicate with one or more core networks through a radio access network (RAN). For example, the terminal device may be a mobile phone, or a computer having a mobile terminal. Alternatively, the terminal device may be a portable, pocket-sized, handheld, computer built-in, or in-vehicle mobile apparatus, and exchanges voice and/or data with the radio access network. In addition, an access network device may be an evolved Node B (eNB or e-NodeB) in the LTE system and the evolved system thereof, a macro base station, a micro base station, a pico base station, an access point (AP), or a transmission point (TP), or the like. This is not limited in this application.

For the convenience of description, a scenario of this application is described by using the access network device as an example. In the scenario shown in FIG. 1, when sending a signal to the cell base station 101 on a channel in an unlicensed spectrum, the terminal device 103 first needs to obtain permission to use the channel in the unlicensed spectrum before sending the signal on the channel in the unlicensed spectrum.

In this embodiment of this application, when the terminal device sends the signal on the channel in the unlicensed spectrum, a send time point of the signal is not limited to a time point corresponding to a frame boundary, a subframe boundary, or a symbol boundary, instead, the signal can be sent at any time point in a time period, so that this embodiment increases a probability of sending a signal on the channel in the unlicensed spectrum on the unlicensed spectrum resource.

The following describes in detail the embodiments of this application with reference to specific examples. It should be noted that the examples are merely used to help persons skilled in the art to better understand the embodiments of this application, but are not intended to limit the scope of the embodiments of this application. It may be understood that in various embodiments of this application, sequence numbers of processes of the method described below do not mean an execution order, and the execution order of the processes should be determined based on functions and internal logics thereof. The sequence numbers should not constitute any limitation to an implementation process of the embodiments of this application.

Embodiment 1

Figure 2:
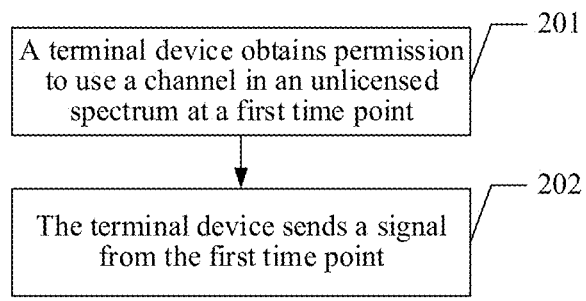
FIG. 2 is a schematic diagram of an embodiment of a signal transmission method according to an embodiment of this application.

This embodiment of this application provides a signal transmission method. The method provided in this embodiment of the present invention may be applied to a scenario of using a channel resource in an unlicensed spectrum. Specifically, referring to FIG. 2, FIG. 2 is a schematic diagram of an embodiment of the signal transmission method in this embodiment of this application. The method includes the following steps.

201. A terminal device determines that permission to use a channel in an unlicensed spectrum is obtained at a first time point.

The first time point is any time point within a time window.

A start time point of the time window is a start time point of a symbol or is prior to the start time point of the symbol, and an end time point of the time window is a second time point or is prior to the second time point.

The second time point is within a time occupied by the symbol, and the symbol is a symbol used to send a signal.

The signal includes at least an actual cyclic prefix and an information segment, the actual cyclic prefix and the information segment are temporally continuous, and the actual cyclic prefix is prior to the information segment.

Duration of the actual cyclic prefix is less than or equal to first duration of a preset cyclic prefix, and the first duration is a time length between the start time point of the symbol and the second time point.

In a specific process of implementing step 201, optionally, the terminal device obtains the permission to use the channel in the unlicensed spectrum in a contention method. More specifically, the terminal device may obtain the right of use based on an LBT criterion by using a contention method. When the terminal device needs to transmit a signal by using an unlicensed spectrum, there may be a plurality of manners of determining whether a channel in a current unlicensed spectrum is idle, in other words, whether the channel is available. If the channel is available, it indicates that permission to use the channel in the unlicensed spectrum is obtained. There may be the following two manners of determining whether the channel in the current unlicensed spectrum is idle.

In the first manner, the terminal device detects a channel on an unlicensed spectrum resource and determines whether the channel is in an idle state within a consecutive time length $T_d$. If the channel is in the idle state, it indicates that the terminal device obtains permission to use the channel, in other words, the terminal device can transmit a signal on the channel; otherwise, it indicates that the terminal device does not obtain permission to use the channel, in other words, the terminal device cannot transmit a signal on the channel.

In the second manner, the terminal device detects a channel on an unlicensed spectrum resource and determines whether the channel is in an idle state within a consecutive time length $T_d$. If the channel is the idle state and a value N of a counter in the following step 4 is 0, the terminal device determines that permission to use the channel is obtained, in other words, the terminal device can transmit a signal on the channel A specific detection process is shown in the following steps.

1. Set $N=N_{init}$. $N_{init}$ is a number randomly selected from 0 to $CW_p$, $CW_p$ may be considered as a length of a contention window, and $N_{init}$ or $CW_p$ may be determined by the terminal device itself, or may be notified by an access network device. This is not specifically limited herein.

2. If N>0, the terminal device subtracts 1 from the value N of a counter, to be specific, sets N=N−1.

3. Detect the channel, and determine whether the channel is in an idle state within a consecutive time length $T_{sl}$, and if the channel is in an idle state, perform step 4; otherwise, perform step 5.

4. If N=0, end the process; otherwise, perform step 2.

5. Detect the channel and determine whether the channel is in the idle state within the consecutive time length $T_d$.

6. If the channel is in the idle state within the consecutive time length $T_d$, perform step 2; otherwise, perform step 5.

It should be noted that specific values of parameters used in the foregoing two methods, for $T_d$, $T_{sl}$, and $CW_p$, are not limited herein, and may be set according to an actual application case. Optionally, a value of $T_d$ is 25 μs, a value of $T_{sl}$ is 9 μs, a maximum value of $CW_p$ is 1023, and a minimum value of $CW_p$ is 3. In addition, in an actual application, the terminal device may further determine, by using another method, whether the permission to use the channel on the unlicensed spectrum resource is obtained.

This is not specifically limited herein. For example, the terminal device may obtain the permission to use the channel in the unlicensed spectrum after performing coordination or scheduling with a neighboring communications device, or the terminal device may determine, by using a preconfigured resource use pattern, that the permission to use the channel in the unlicensed spectrum is obtained. Details are not described herein again.

Optionally, the permission to use the channel in the unlicensed spectrum may be permission to use a carrier in the unlicensed spectrum. Optionally, the permission to use the channel in the unlicensed spectrum may be permission to use a physical channel transmitted in the unlicensed spectrum.

In a specific process of implementing step 201, the first time point is any time point within the time window, the start time point of the time window may be the start time point of the symbol or prior to the start time point of the symbol, and this is not limited herein. The end time point of the time window may be the second time point or prior to the second time point, and this is not specifically limited herein. The second time point is within the time occupied by the symbol, and the symbol is a symbol used to send a signal.

It should be noted that in an uplink transmission process of a system, a signal transmission action of the terminal device may be scheduled by the access network device. To be specific, the access network device instructs, by using signaling, the terminal device to perform transmission on a physical uplink shared channel (PUSCH), a physical uplink control channel (PUCCH), or a physical random access channel (PRACH) in a specific symbol or subframe. In addition, it should be noted that for transmission of a random access preamble sequence, the access network device may reserve a plurality of PRACH resources, and the terminal device transmits the random access preamble sequence on at least one of the plurality of PRACH resources.

In this embodiment of this application, the signal sent by the terminal device may be a random access preamble sequence on the PRACH, or may be information carried in at least one symbol on the PUSCH or the PUCCH, or may be an uplink demodulation reference signal (DMRS) or sounding reference signal (SRS), or the like. This is not specifically limited herein.

It should be noted that when the method is applied to the channel in the unlicensed spectrum, a channel structure of the PRACH, the PUSCH, or the PUCCH and a channel structure of a PRACH, a PUSCH, or a PUCCH in an LTE system may be the same or may be different. The random access preamble sequence may be an existing random access preamble sequence in any one of format 0 to format 4, or may be a new random access preamble sequence. This is not limited in this application. For the convenience of understanding and description, in this embodiment of this application, a description is given by using an example in which the signal sent by the terminal device is the existing random access preamble sequence.

The existing random access preamble sequence includes two parts: a cyclic prefix and an information segment. The cyclic prefix and the information segment are temporally continuous, the cyclic prefix is prior to the information segment, the information segment includes all information of the random access preamble sequence, and the cyclic prefix repeats a part of the information segment of the signal. There may be five formats based on different time lengths occupied by the cyclic prefix or the information segment. Table 1 provides lengths of the cyclic prefix and the information segment in each format and an occupied time in an LTE system during transmission of a random access preamble sequence in this format. Optionally, the time occupied during transmission further includes guard duration. $T_s$ is a time unit of the LTE system, $T_s=1/(15000 \cdot 2048)$ seconds, and $30720 \cdot T_s$ is 1 millisecond, in other words, one subframe.

TABLE 1

| Sequence format | Cyclic prefix | Information segment | Time occupied during transmission |
|---|---|---|---|
| 0 | $3168 \cdot T_s$ | $24576 \cdot T_s$ | $30720 \cdot T_s$ |
| 1 | $21024 \cdot T_s$ | $24576 \cdot T_s$ | $2 \cdot 30720 \cdot T_s$ |
| 2 | $6240 \cdot T_s$ | $2 \cdot 24576 \cdot T_s$ | $2 \cdot 30720 \cdot T_s$ |
| 3 | $21024 \cdot T_s$ | $2 \cdot 24576 \cdot T_s$ | $3 \cdot 30720 \cdot T_s$ |
| 4 | $448 \cdot T_s$ | $4096 \cdot T_s$ | $4832 \cdot T_s$ |

It should be noted that in each of the foregoing formats, duration of the cyclic prefix is the first duration of the preset cyclic prefix. In a transmission process of a signal, the signal includes at least an actual cyclic prefix and an information segment, the actual cyclic prefix and the information segment are temporally continuous, and the actual cyclic prefix is prior to the information segment. Duration of the actual cyclic prefix is a length of a transmitted cyclic prefix of the signal.

In a specific process of implementing step 201, optionally, the duration of the actual cyclic prefix is less than the first duration of the preset cyclic prefix. Optionally, the duration of the actual cyclic prefix is equal to the first duration of the preset cyclic prefix.

Optionally, before the terminal device obtains the permission to use the channel in the unlicensed spectrum, the terminal device may determine at least one piece of the following information based on indication information sent by the access network device or predefined configuration:
 a length of the time window;
 the start time point of the time window;
 the end time point of the time window;
 the start time point of the symbol;
 the second time point; and
 the first duration.

It should be noted that in all embodiments of this application, all indication information may be sent by the access network device to the terminal device by using physical layer signaling, Media Access Control (MAC) layer signaling, or Radio Resource Control (RRC) signaling. Optionally, all indication information may be sent by the access network device to the terminal device by using a current carrier or a non current carrier.

Optionally, the access network device sends scheduling information to the terminal device, to instruct the terminal device to perform signal transmission in a specified symbol or subframe. The terminal device determines a start time point of the symbol based on the scheduling information.

Optionally, the start time point of the time window is the start time point of the symbol. Optionally, the start time point of the time window may be prior to the start time point of the symbol. If the terminal device obtains the permission to use the channel in the unlicensed spectrum before the start time point of the time window, the terminal device may send a variable-length channel reservation signal or a cyclic prefix from the time point at which the permission to use the channel in the unlicensed spectrum is obtained to the start time point of the time window, to avoid that because the terminal device does not occupy the channel in the unlicensed spectrum in time after obtaining the permission to use the channel, the channel is occupied by another communications device.

Optionally, if the terminal device needs to send a random access preamble sequence, the terminal device may determine a time-domain location of a PRACH resource based on the indication information of the access network device, to determine the start time point of the symbol. Optionally, the access network device sends the indication information to the terminal device, to indicate a format of the random access preamble sequence, and the terminal device determines the first duration or the second time point based on the format of the random access preamble sequence.

202. The terminal device sends a signal from the first time point.

In this embodiment of this application, after the terminal device determines that the permission to use the channel in the unlicensed spectrum is obtained at the first time point, the terminal device may send the signal from the first time point.

Figure 3:
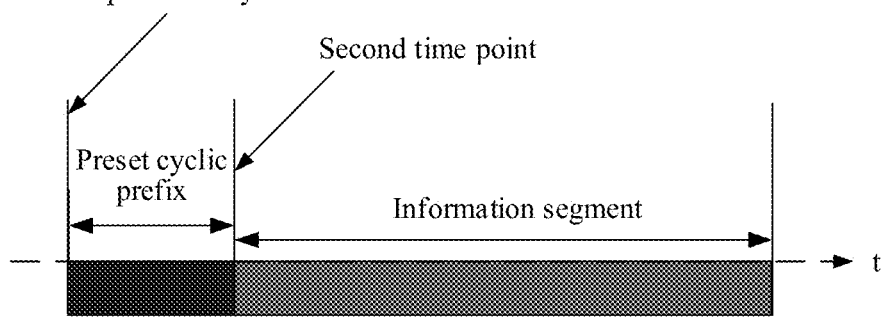
FIG. 3 is a schematic diagram of a preset time-domain resource of a signal according to an embodiment of this application.

Referring to FIG. 3, a time-domain structure of a random access preamble sequence in the LTE system is shown in FIG. 3, and includes a symbol including a preset cyclic prefix and an information segment. To adapt to cells with different coverage, random access preamble sequences in five formats shown in Table 1 are defined.

As shown in Table 1, random access preamble sequences in different formats occupy preset cyclic prefixes or information segments having different duration in the time-domain resource. In this embodiment of this application, if the terminal device does not obtain the permission to use the channel in the unlicensed spectrum at the start time point of the symbol, but obtains the permission to use the channel in the unlicensed spectrum a time period after the start time point of the symbol, the terminal device can still send the random access preamble sequence.

Specifically, there may be the following two optional sending manners.

Manner 1:

The terminal device sends the actual cyclic prefix of the signal from the first time point to the second time point. The duration of the actual cyclic prefix is less than the first duration of the preset cyclic prefix. In other words, the terminal device obtains the permission to use the channel in the unlicensed spectrum after the start time point of the symbol.

The terminal device sends the information segment of the signal from the second time point.

Preferably, the duration of the actual cyclic prefix is greater than or equal to the second duration.

Optionally, before the terminal device obtains the permission to use the channel in the unlicensed spectrum at the first time point, the terminal device may determine the second duration based on the indication information sent by the access network device or the predefined configuration. This is not specifically limited herein.

It should be noted that if a signal needing to be transmitted by the terminal device after performing channel detection includes a plurality of consecutive symbols, this manner is applied to the first symbol of the signal. For example, assuming that a random access preamble sequence in a format including a plurality of consecutive symbols is transmitted on the channel in the unlicensed spectrum, this manner may be applied to the first symbol of the random access preamble sequence.

Figure 4A:
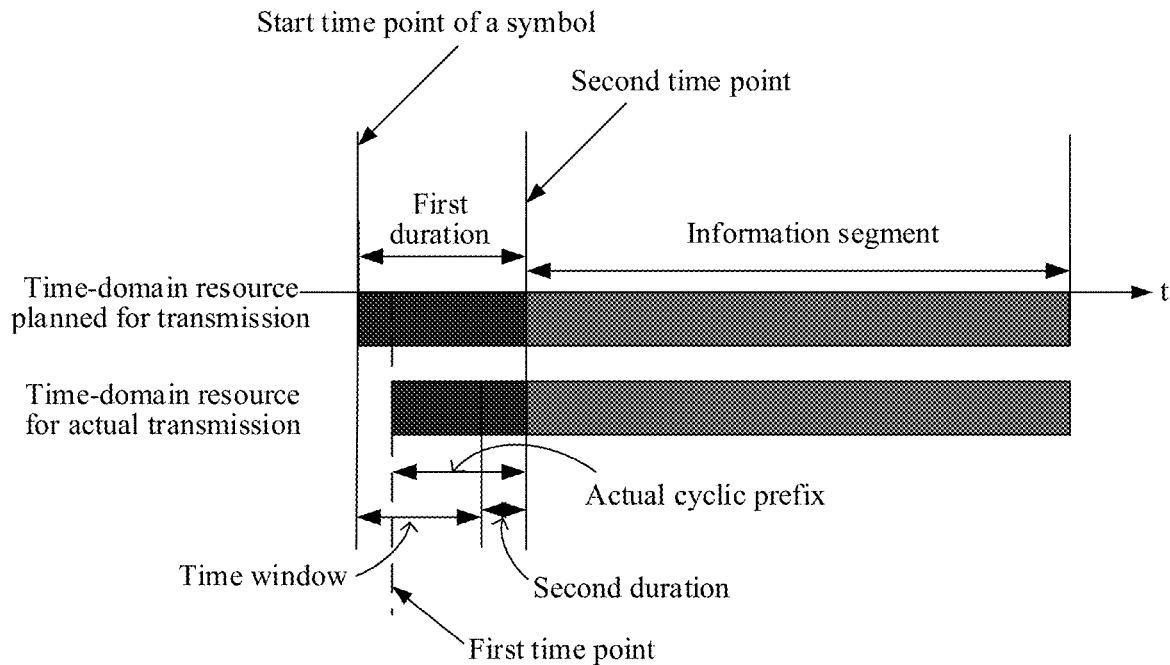
FIG. 4a is a schematic diagram of another embodiment of a signal transmission method according to an embodiment of this application.

A specific sending manner is shown in FIG. 4a. In the figure, a time-domain resource planned for transmission is a time-domain resource occupied by a preset random access preamble sequence. It is assumed herein that the start time point of the time window is the start time point of the symbol, and the end time point of the time window is prior to the second time point. The time length from the start time point of the symbol to the second time point is the first duration of the preset cyclic prefix. Assuming that the terminal device determines that the permission to use the channel in the unlicensed spectrum is not obtained at the start time point of the symbol, but the permission to use the channel in the unlicensed spectrum is obtained at any time point within the time window, the time point is the first time point. FIG. 4a shows one first time point. The first time point is later than the start time point of the symbol and is prior to the end time point of the time window. Because a start time point of sending an information segment of the preset random access preamble sequence is the second time point, and the preset cyclic prefix is merely used to cyclically repeatedly send a part of content of the information segment of the signal, the terminal device may send, within a time period from the first time point to the second time point, a cyclic prefix that is of a random access preamble sequence and whose time length is less than the preset cyclic prefix. The cyclic prefix is the actual cyclic prefix. In other words, no other information is transmitted in a time-domain resource that is prior to the first time point and that is planned to transmit a cyclic prefix. The terminal device sends the information segment part of the random access preamble sequence from the second time point.

Preferably, in an actual application, considering that a main function of a cyclic prefix is to overcome an impact caused by a round-trip time of signal transmission and multipath interference during signal transmission to signal demodulation performance, the duration of the actual cyclic prefix of the random access preamble sequence needs to be greater than or equal to the second duration. Optionally, the time length from the end time point of the time window to the second time point is the second duration, and FIG. 4a shows the second duration in this case. Optionally, the second duration is greater than or equal to a sum of maximum round-trip duration of signal transmission between the terminal device and the access network device and a maximum possible channel delay spread. Optionally, considering that the second duration may be determined uniformly for all terminal devices in a cell, the second duration is greater than or equal to a sum of maximum round-trip duration of signal transmission between an edge terminal device in a cell of the terminal device and the access network device and the maximum possible channel delay spread. The duration of the actual cyclic prefix of the random access preamble sequence is greater than or equal to the second duration, so that demodulation performance of the random access preamble sequence sent by the terminal device and received by the access network device can be ensured. Herein, it should be noted that in this embodiment of this application, a specific value of the second duration may be determined based on an actual application case. This is not limited herein.

Optionally, the terminal device may determine the second duration based on the indication information sent by the access network device. The indication information includes at least one of the second duration, a start time point of the second duration, and an end time point of the second duration.

For the convenience of understanding and descriptions, the sending manner in this embodiment of this application is described in detail by using an example in which the format of the sent random access preamble sequence is the format 0.

As shown in Table 1, when the format of the random access preamble sequence is the format 0, duration occupied by a preset cyclic prefix of a preset random access preamble sequence, duration occupied by an information segment of the preset random access preamble sequence, and duration occupied by transmission of the preset random access preamble sequence are respectively $3168 \cdot T_s$, $24576 \cdot T_s$, and $30720 \cdot T_s$. For the convenience of description, duration information herein is represented by using microsecond (μs), and the duration occupied by the preset cyclic prefix, the duration occupied by the information segment, and the duration occupied by the transmission are respectively 103.1 μs, 800 μs, and 1000 μs. In other words, the random access preamble sequence in the format 0 occupies one subframe. In addition, the duration occupied by the transmission further includes guard duration, and the guard duration is (1000−800−103.1) μs=96.9 μs. A function of the guard duration is to avoid interference between a random access preamble sequence sent by a terminal device in a cell center and a random access preamble sequence sent by a terminal device on a cell edge.

It may be understood that when the maximum round-trip duration of signal transmission between the terminal device and the access network device is equal to a smaller value in the preset cyclic prefix and the guard duration, coverage of a cell supporting the random access preamble sequence in format 0 is approximately $(96.9 \times 10^{-6}/2) \times 3 \times 10^5$ kilometers=14.5 kilometers. $10^x$ represents 10 raised to the power of x, and $3 \times 10^5$ kilometers per second represents the speed of light. Because signal transmission on a carrier in the unlicensed spectrum is limited by a maximum transmit power or a maximum transmit power density in the spectrum, maximum coverage of a cell using the spectrum is relatively small. For example, the cell coverage does not exceed 1.5 kilometers.

Assuming that the maximum coverage of the cell in the unlicensed spectrum is 1.5 kilometers, and a maximum channel delay spread needing to be considered in the cell is 5 μs, a length of a cyclic prefix used to overcome the impact caused by the round-trip time of signal transmission and the multipath interference during signal transmission to the signal demodulation performance is $[1.5 \times 2/(3 \times 10^5) \times 10^6 + 5]$ μs=15 μs. When a random access preamble sequence of the cell uses the format 0, in an embodiment, based on the foregoing description, it may be considered that the start time point of the time window is a start time point of a symbol planned for transmitting the random access preamble sequence in the format 0, the second time point is the end time point of the preset cyclic prefix, the first duration is 103.1 μs, the second duration is 15 μs, the length of the time window is 103.1−15=88.1 μs, and the time length between the end time point of the time window and the second time point is the second duration. The terminal device obtains the permission to use the channel at any time point within the time window, and can send the random access preamble sequence. In other words, the terminal device has extra 88.1 μs to detect whether the channel is idle.

Herein, it should be noted that specific duration of the maximum channel delay spread and specific duration of the maximum round-trip duration described above are merely used for description by way of example. In an actual application, the two may have different changes, and this is not specifically limited herein.

Figure 4B:
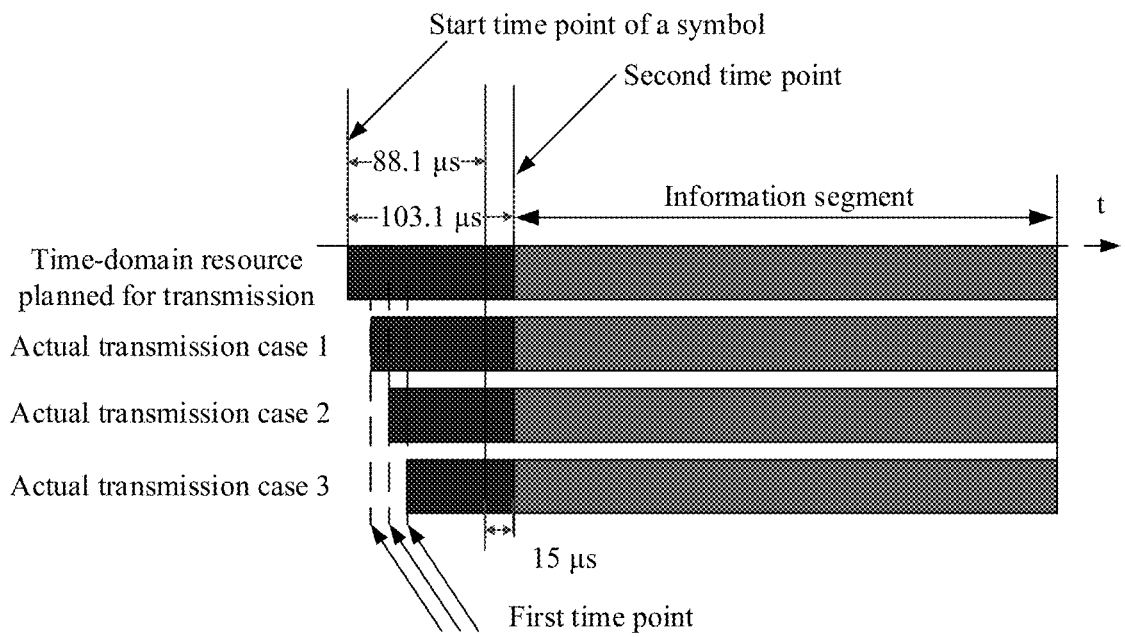
FIG. 4b is a schematic diagram of another embodiment of a signal transmission method according to an embodiment of this application.

A specific sending manner is shown in FIG. 4b. FIG. 4b provides four transmission cases in this manner. If the terminal device does not obtain the permission to use the channel in the unlicensed spectrum at the start time point of the symbol, if the terminal device obtains the permission to use the channel in the unlicensed spectrum within 88.1 μs following the start time point of the symbol, the terminal device can send a random access preamble sequence, and it is ensured that duration of a cyclic prefix of the sent random access preamble sequence is greater than 15 μs.

Herein, it is assumed that any time point within 88.1 μs following the start time point of the symbol is the first time point, and a preset start time point of sending an information segment of a random access preamble sequence is the second time point. If the terminal device does not obtain the permission to use the channel in the unlicensed spectrum at the start time point of the symbol, but obtains the permission to use the channel on the unlicensed spectrum resource at the first time point, the terminal device may send an actual cyclic prefix part of the random access preamble sequence within a time period from the first time point to the second time point, and send the information segment part of the random access preamble sequence from the second time point.

Figure 4C:
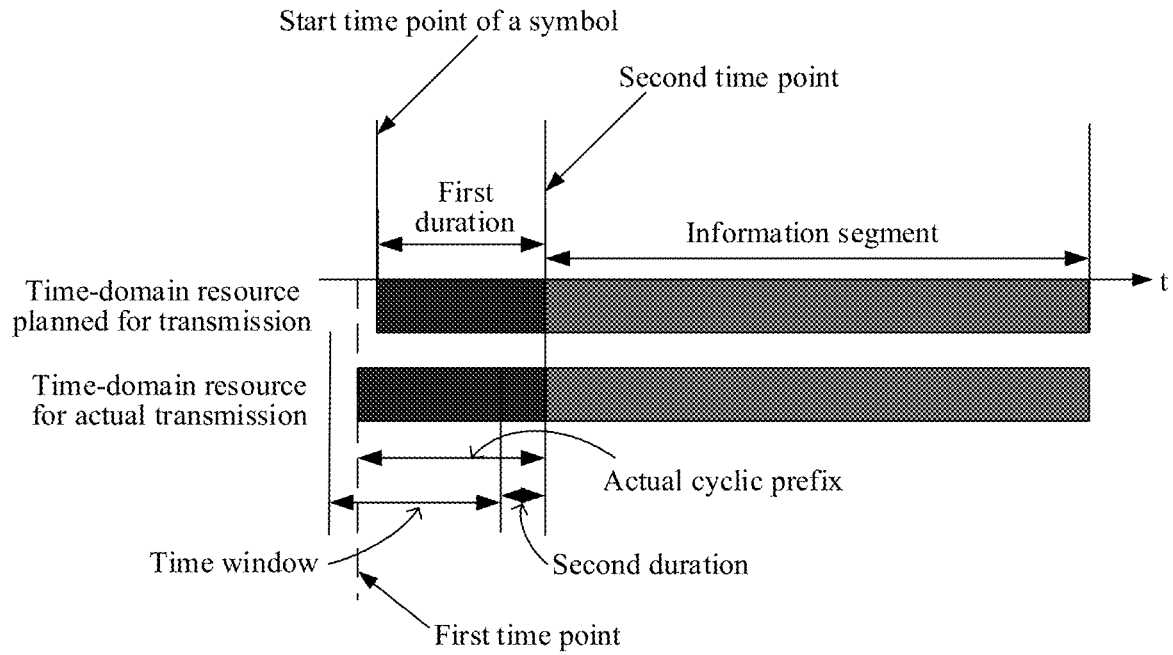
FIG. 4c is a schematic diagram of another embodiment of a signal transmission method according to an embodiment of this application.

It should be noted that if the terminal device obtains the permission to use the channel in the unlicensed spectrum before the start time point of the symbol, the terminal device may send an actual cyclic prefix of a signal within the time period from the first time point to the second time point. Duration of the actual cyclic prefix is greater than the first duration of the preset cyclic prefix. FIG. 4c is a schematic diagram in this scenario.

It may be understood that in this embodiment of this application, sending methods of a random access preamble sequence in the format 1 to a random access preamble sequence in the format 4 are similar to the sending method of the random access preamble sequence in the format 0 described above. Details are not described herein again, and the sending methods are within the scope of this application.

In this embodiment of this application, the signal transmission method in this application is described by using an example in which a sent signal is a random access preamble sequence, and a format of the random access preamble sequence is the format 0. The terminal device obtains the permission to use the channel in the unlicensed spectrum at the first time point, where the first time point is any time point within a segment of a time window, a start time point of the time window is not later than a preset start time point of sending a random access preamble sequence, an end time point of the time window is not later than the second time point, and the second time point is a preset start time point of sending an information segment of the random access preamble sequence. Then, the terminal device sends an actual cyclic prefix of the sequence within the time period from the first time point to the second time point, and sends the information segment of the sequence from the second time point. In other words, duration occupied by a cyclic prefix part finally sent by the terminal device is less than first duration of a preset cyclic prefix of a random access preamble sequence, so that a random access preamble sequence sending opportunity is increased by reducing duration of a cyclic prefix.

In this embodiment of this application, when a random access preamble sequence is sent on a channel in an unlicensed spectrum on an unlicensed spectrum resource, a send time point of the random access preamble sequence is not limited to a frame boundary, a subframe boundary, or a symbol boundary, instead, the random access preamble sequence can be sent at any time point in a time period, so that this embodiment increases a random access preamble sequence sending opportunity. In other words, when a signal is sent on the unlicensed spectrum resource, a signal sending probability is increased.

In addition, in this embodiment of this application, it is ensured that the duration of the cyclic prefix of the sent random access preamble sequence is greater than the sum of the maximum round-trip duration of signal transmission between the terminal device and the access network device and the maximum channel delay spread. In an actual application, practicability of the technical solution of this embodiment of this application is ensured, and it is further ensured that the terminal device can successfully send the random access preamble sequence.

Manner 2:

Different from manner 1, in manner 2, the duration of the actual cyclic prefix of the random access preamble sequence is equal to the duration of the preset cyclic prefix;

a symbol includes guard duration;

the end time point of the time window is prior to the second time point; and duration between the start time point of the symbol and the end time point of the time window is equal to third duration, and the third duration is less than a smaller value in the duration of the preset cyclic prefix and the guard duration.

Optionally, before the terminal device obtains the permission to use the channel in the unlicensed spectrum, the terminal device may determine the third duration based on the indication information sent by the access network device or the predefined configuration. This is not specifically limited herein.

It should be noted that if a signal needing to be transmitted by the terminal device after the terminal device performs channel detection includes a plurality of consecutive symbols, in this manner, sending of the signal is delayed by a time period, and a delayed time length is a length between the start time point of the symbol and the first time point.

Figure 5A:
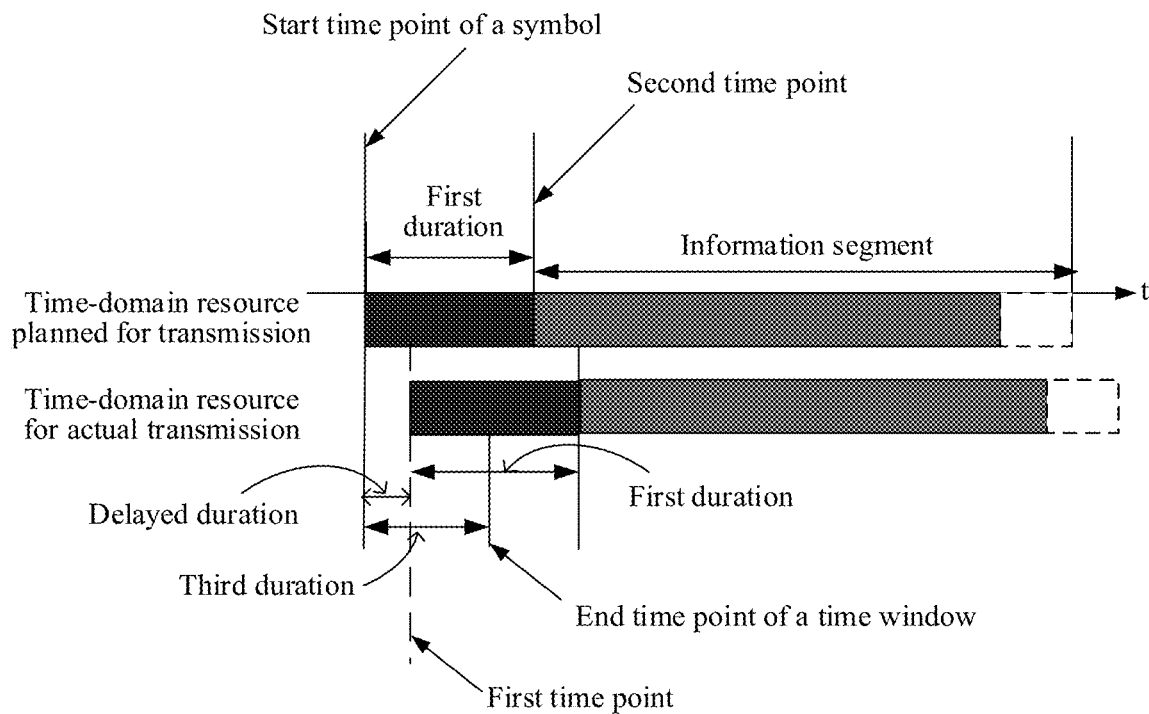
FIG. 5a is a schematic diagram of another embodiment of a signal transmission method according to an embodiment of this application.

A specific sending manner is shown in FIG. 5a. Herein, it is assumed that the start time point of the time window is the start time point of the symbol, and the end time point of the time window is prior to the second time point. The time length from the start time point of the symbol to the second time point is the first duration of the preset cyclic prefix. The symbol further includes the guard duration. Assuming that the terminal device does not obtain the permission to use the channel in the unlicensed spectrum at the start time point of the symbol, but obtains the permission to use the channel in the unlicensed spectrum at any time point within the time window, the time point is the first time point. FIG. 5a shows one first time point. The first time point is later than the start time point of the symbol and is prior to the end time point of the time window. The terminal device sends the signal from the first time point. In other words, in this manner, it is allowed that the terminal device delays sending the signal. However, an excessively long delayed time not only affects demodulation performed by the access network device on the transmitted signal, but also affects transmission of a signal following the signal. Therefore, the duration between the start time point of the symbol and the end time point of the time window is equal to the third duration. In other words, in this manner, a maximum delayed time when the terminal device sends the signal is allowed to be the third duration, and the third duration is less than a smaller value in the first duration and the guard duration. Herein, it should be noted that a specific value of the third duration may be determined based on an actual application case. This is not limited herein.

Optionally, the method further includes:

determining, by the terminal device, information about the duration between the first time point and the start time point of the symbol, in other words, information about the delayed duration in FIG. 5a;

sending, by the terminal device, the duration information to the access network device; and subtracting, by the access network device, the delayed duration when estimating a timing advance TA of the terminal device, to obtain actual TA information of the terminal device, and sending the obtained TA information to the terminal device.

Optionally, the terminal device may not report, to the access network device, the information about the duration that is between the first time point and the start time point of the symbol and by which signal sending is delayed, but subtracts the delayed duration from duration obtained from received TA information sent by the access network device, to obtain actual TA information of the terminal device.

It should be noted that in this embodiment, the terminal device may quantize the duration into a multiple of a sampling rate when processing the duration information, and as a result, there may be some quantization losses. This is not limited in this embodiment.

It may be understood that content of Table 2 may be obtained based on Table 1. In other words, lengths of time-domain resources occupied by cyclic prefixes or information segments of random access preamble sequences in different formats are different. Persons skilled in the art may learn that duration of a guard time affects coverage of a cell. Table 2 shows duration of parts of random access preamble sequences in five formats.

TABLE 2

| Sequence format | Time (μs) occupied by transmission | Cyclic prefix (μs) | Information segment (μs) | Guard time (μs) |
| --- | --- | --- | --- | --- |
| 0 | 1000 | 103.1 | 800 | 96.9 |
| 1 | 2000 | 684.4 | 800 | 515.6 |
| 2 | 2000 | 203.1 | 1600 | 196.9 |
| 3 | 3000 | 684.4 | 1600 | 715.6 |
| 4 | 157.3 | 14.6 | 133.3 | 9.4 |

As can be learned from Table 2, each of physical random access channel resources in the format 0 to the format 4 includes a guard time. Lengths of preset cyclic prefixes in the format 0, the format 1, format 2, and format 4 are greater than the guard times, and a length of a preset cyclic prefix in the format 3 is less than the guard time.

Figure 5B:
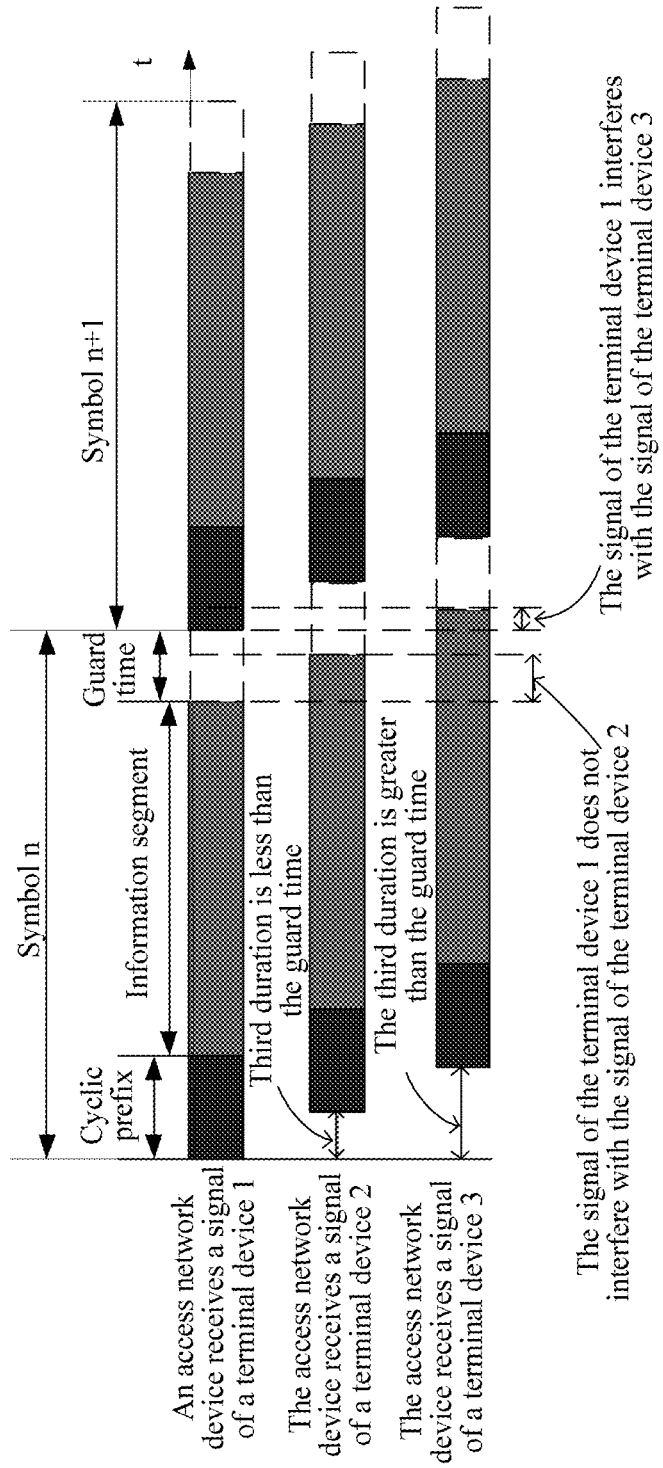
FIG. 5b is a schematic diagram showing that delayed signal transmission causes interference according to an embodiment of this application.

In an actual application, the guard time may enable a symbol that is sent by the terminal device, that is received by the access network device, and that arrives at the access network device late to not interfere with a next symbol sent by another terminal device, as shown in FIG. 5b. FIG. 5b is a schematic diagram of signals received by the access network device in a time domain and respectively sent by three terminal devices in a same symbol. In this schematic diagram, an impact of a signal transmission delay is not considered. There is no delay when a terminal device 1 sends a signal, a delayed time length when a terminal device 2 sends a signal is less than a length of the guard time, and a delayed time length when a terminal device 3 sends a signal is greater than the length of the guard time. As can be learned from FIG. 5*b*, for the terminal device 2, because the length of the time by which the signal is delayed is less than the length of the guard time of the symbol, the signal received by the access network device from the terminal device 2 does not overlap, in the time domain, the signal received by the access network device from the terminal device 1. For the terminal device 3, because the length of the time by which the signal is delayed is greater than the length of the guard time, the signal received by the access network device from the terminal device 3 overlaps, in the time domain, the signal received by the access network device from the terminal device 1. As a result, the signal of the terminal device 3 interferes with the signal of the terminal device 1, affecting performance of demodulating, by the access network device, the signal of the terminal device 3 or the signal of the terminal device 1. Preferably, the third duration is equal to the duration of the guard time. Preferably, the third duration is less than the duration of the guard time. In other words, a guard time is also reserved for a symbol on which sending is delayed. Preferably, the third duration is less than smaller duration in the first duration and the duration of the guard time.

For the format 0, the format 1, the format 2, or the format 4, the symbol includes the guard time, and the duration of the guard time is less than the duration of the preset cyclic prefix. Therefore, in this manner, the third duration is less than or equal to the duration of the guard time.

For the format 3, the symbol includes the guard time, and the duration of the guard time is greater than the duration of the preset cyclic prefix. Therefore, in this manner, the third duration may be less than the duration of the preset cyclic prefix.

Herein, for the convenience of description, a sending process in manner 2 is also described by using an example in which a format of a sent random access preamble sequence is the format 0.

Figure 5C:
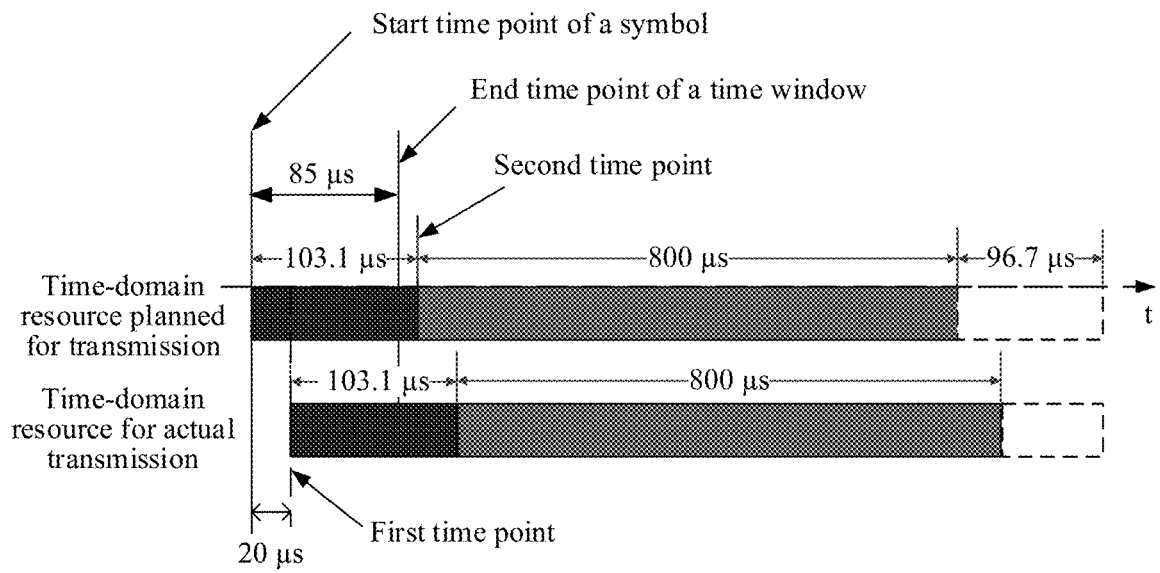
FIG. 5c is a schematic diagram of another embodiment of a signal transmission method according to an embodiment of this application.

Referring to FIG. 5*c*, FIG. 5*c* is a schematic diagram of sending of a random access preamble sequence in the format 0. As described above, duration occupied by a preset cyclic prefix of the random access preamble sequence in the format 0, duration occupied by an information segment of the random access preamble sequence in the format 0, and duration occupied by a guard time of the random access preamble sequence in the format 0 are respectively 103.1 μs, 800 μs, and 96.9 μs. In the figure, the start time point of the symbol is a start time point of the preset cyclic prefix of the preset random access preamble sequence, and the second time point is a start time point of the information segment of the preset random access preamble sequence.

It is assumed that the third duration is 85 μs and is less than the duration of the guard time. In other words, duration between the start time point of the symbol and the end time point of the time window is 85 μs. If the terminal device does not obtain the permission to use the channel in the unlicensed spectrum at the start time point of the symbol, but obtains the permission to use the channel at the first time point prior to the end time point of the time window, and a time length between the first time point and the start time point of the symbol is 20 μs, the terminal device may send the random access preamble sequence from the first time point. A length of an actual cyclic prefix of the random access preamble sequence is equal to the length of the preset cyclic prefix. The terminal device may report, to the access network device, duration information of 20 μs by which signal sending is delayed, so that the access network device subtracts 20 μs when estimating a round-trip time, also referred to as a timing advance TA, of the terminal device, and sends obtained TA information to the terminal device. Alternatively, the terminal device does not report, to the access network device, duration information of 20 μs by which signal sending is delayed, but subtracts 20 μs from duration obtained from TA information received from the access network device, to obtain actual TA information of the terminal device.

It should be noted that the schematic diagram shown in FIG. 5*c* is merely one example in this embodiment of this application.

It should be further noted that in this embodiment of this application, the start time point of the symbol is a start time point determined by the terminal device and used to send a signal, and may be the same as or different from a start time point of a symbol in the system. This is not limited in this application.

Optionally, the terminal device determines the third duration based on the indication information sent by the access network device. The indication information includes at least one of the third duration, the start time point of the third duration, and the end time point of the third duration. This is not limited herein.

In this embodiment of this application, the terminal device obtains the permission to use the channel in the unlicensed spectrum at the first time point. The first time point is any time point within a segment of a time window. A start time point of the time window is not later than a start time point of sending a preset random access preamble sequence, an end time point of the time window is not later than a second time point and does not include the second time point, the second time point is a start time point of sending an information segment of the preset random access preamble sequence. After obtaining the permission to use the channel on the unlicensed spectrum resource at the first time point, the terminal device can send the random access preamble sequence based on a predefined format. Duration of an actual cyclic prefix of the sent random access preamble sequence is equal to the first duration of the preset cyclic prefix, and it is ensured that duration between the start time point of the symbol and the first time point is less than or equal to a smaller length in the first duration and the duration of the guard time, thereby avoiding that signals received by the access network device from different terminal devices interfere with each other.

On the other hand, in this embodiment of this application, the terminal device may further determine duration between the start time point of the symbol and a time point at which the permission to use the channel in the unlicensed spectrum is obtained, and reports the duration information to the access network device, so that the access network device subtracts the time from a measured round-trip transmission time of the terminal device, to obtain an actual round-trip transmission time of the terminal device.

Embodiment 2

Figure 6:
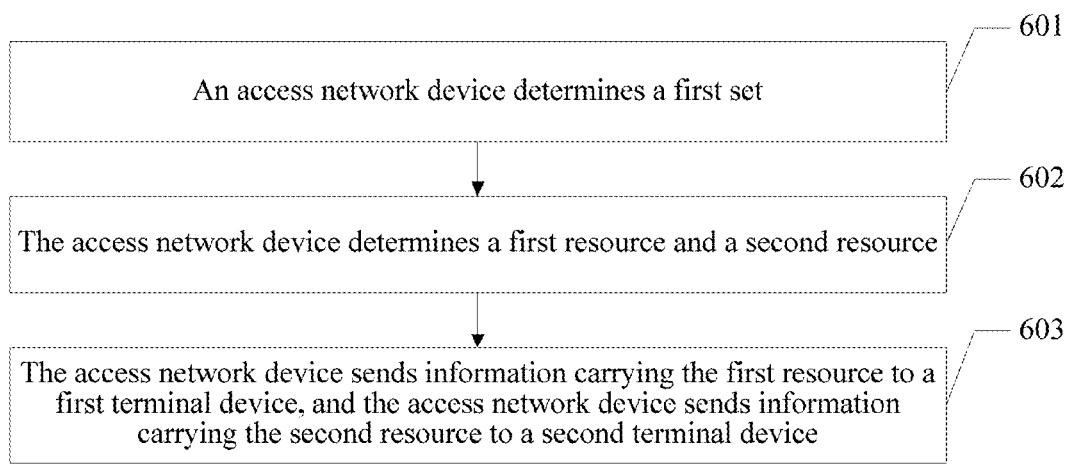
FIG. 6 is a schematic diagram of another embodiment of a signal transmission method according to an embodiment of this application.

This embodiment of this application provides a signal transmission method. The method provided in this embodiment of this application may be applied to a scenario of using a channel resource in an unlicensed spectrum. Referring to FIG. 6, FIG. 6 is a schematic diagram of an embodiment of the signal transmission method in this embodiment of this application. The method includes the following steps.

601. An access network device determines a first set.

The first set includes at least two preset start time points for signal transmission in one subframe.

Optionally, the first set includes at least two preset start time points for signal transmission in one subframe. The access network device may determine start time points of some symbols in one subframe as time points at which a terminal device may perform signal transmission. For example, the access network device determines symbol 1, symbol 4, symbol 7, symbol 10, and symbol 13 in one subframe as symbols on which the terminal device may perform signal transmission. Then, the first set includes five time points, namely, start time points of the symbol 1, the symbol 4, the symbol 7, the symbol 10, and the symbol 13. A first time point is the start time point of one of the symbol 1, the symbol 4, the symbol 7, the symbol 10, and the symbol 13.

Optionally, one subframe is an entire uplink subframe.

Optionally, one subframe is a part of an uplink subframe, and the part of the uplink subframe is a subframe in which at least one symbol is not used for uplink transmission. Further, optionally, one subframe is a part of an uplink subframe, the part of the uplink subframe is a subframe in which at least the last symbol is not used for uplink transmission. Alternatively, one subframe is a part of an uplink subframe, and the part of the uplink subframe is a subframe in which at least the first symbol is not used for uplink transmission.

602. The access network device determines a first resource and a second resource.

The first resource and the second resource are different frequency-domain resources, and start time points of the first resource and the second resource in a time domain are both the first time point.

The first time point is a time point in the first set.

The first resource is used to transmit a first signal, and the second resource is used to transmit a second signal.

It should be noted that an order between step 601 and step 602 is not limited.

Optionally, the first resource is used to transmit a physical random access preamble sequence, and the second resource is used to transmit a sounding reference signal. Further, optionally, the first resource is used to transmit a physical random access preamble sequence in format 4 in an LTE system or an evolved system thereof, and the second resource is used to transmit a sounding reference signal in the LTE system or the evolved system thereof.

Optionally, the first resource and the second resource are both used to transmit a physical random access preamble sequence. Further, optionally, the first resource and the second resource are both used to transmit a physical random access preamble sequence in format 4 in an LTE system or an evolved system thereof.

Optionally, the first resource and the second resource are both used to transmit a sounding reference signal. Further, optionally, the first resource and the second resource are both used to transmit the sounding reference signal in an LTE system or an evolved system thereof.

Figure 7A:
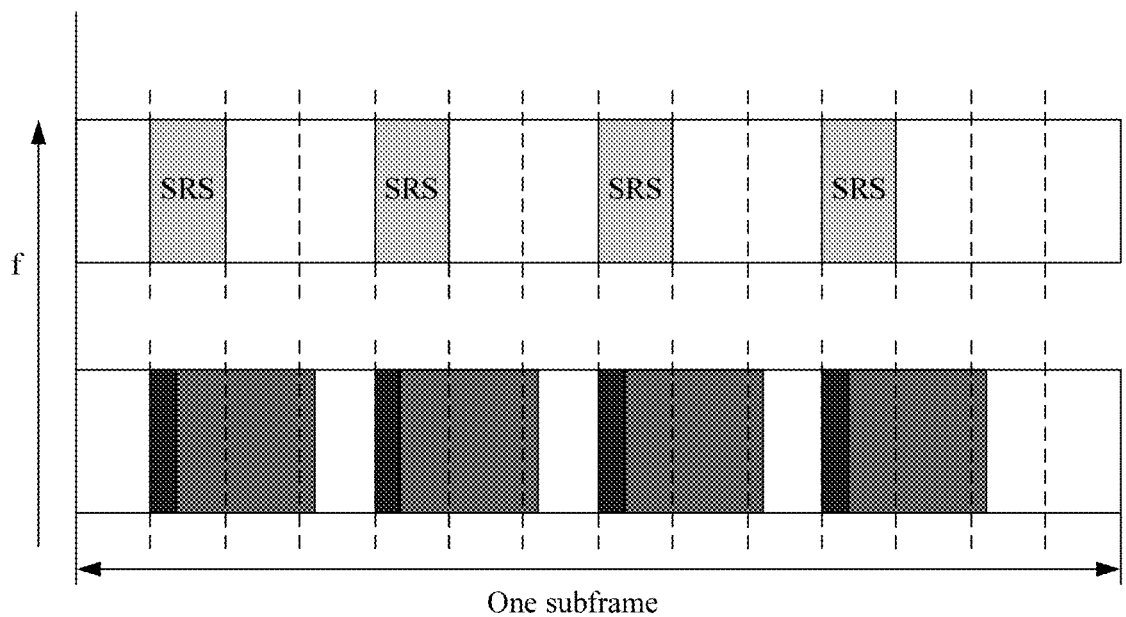
FIG. 7a is a schematic diagram of another embodiment of a signal transmission method according to an embodiment of this application.

FIG. 7a is a schematic diagram showing that an access network device determines a first resource and a second resource. As shown in FIG. 7, the access network device determines the first set. The first set includes preset start time points used for signal transmission in an entire uplink subframe. Specifically, the first set includes four time points, namely, the start time points of the symbol 1, the symbol 4, the symbol 7, and the symbol 10, and the first time point is the start time point of one of the symbol 1, the symbol 4, the symbol 7, and the symbol 10. Assuming that the first time point is the start time point of the symbol 4, the access network device determines to allocate the first resource and the second resource from the start time point of the symbol 4. The first resource and the second resource are different frequency-domain resources. The first resource is used to transmit a physical random access preamble sequence, and the second resource is used to transmit a sounding reference signal.

Figure 7B:
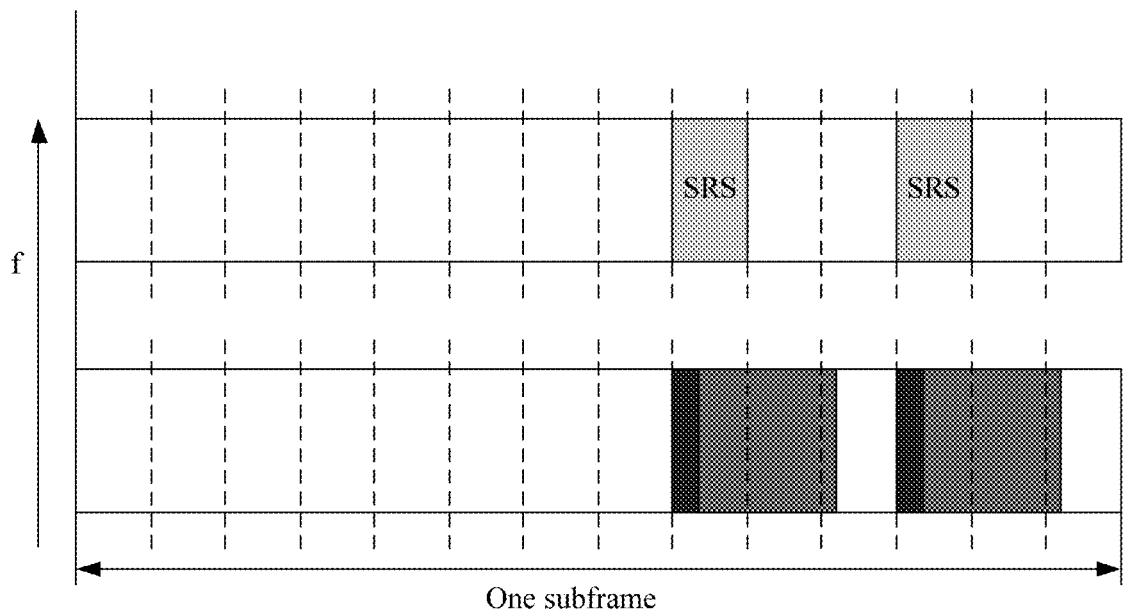
FIG. 7b is a schematic diagram of another embodiment of a signal transmission method according to an embodiment of this application.

FIG. 7b is a schematic diagram showing that an access network device determines a first resource and a second resource. As shown in FIG. 7b, the access network device determines the first set. The first set includes preset start time points used for signal transmission in a part of an uplink subframe, and the part of the uplink subframe is a subframe in which at least the first symbol is not used for uplink transmission. Specifically, the first set includes two time points, namely, start time points of symbol 8 and symbol 11, and the first time point is the start time point of one of the symbol 8 and the symbol 11. Assuming that the first time point is the start time point of the symbol 8, the access network device determines to allocate the first resource and the second resource from the start time point of the symbol 8. The first resource and the second resource are different frequency-domain resources. The first resource is used to transmit a physical random access preamble sequence, and the second resource is used to transmit a sounding reference signal.

Figure 7C:
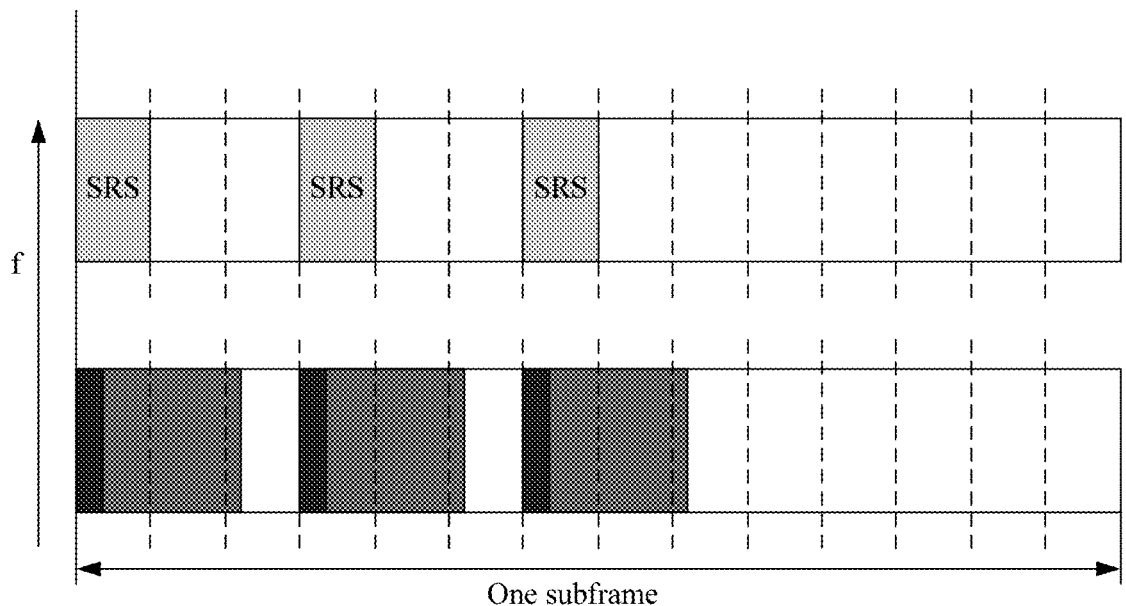
FIG. 7c is a schematic diagram of another embodiment of a signal transmission method according to an embodiment of this application.

FIG. 7c is a schematic diagram showing that an access network device determines a first resource and a second resource. As shown in FIG. 7c, the access network device determines the first set. The first set includes preset start time points used for signal transmission in a part of an uplink subframe, and the part of the uplink subframe is a subframe in which at least the last symbol is not used for uplink transmission. Specifically, the first set includes three time points, namely, start time points of symbol 0, symbol 3, and symbol 6, and the first time point is the start time point of one of the symbol 0, the symbol 3, and the symbol 6. Assuming that the first time point is the start time point of the symbol 3, the access network device determines to allocate the first resource and the second resource from the start time point of the symbol 3. The first resource and the second resource are different frequency-domain resources. The first resource is used to transmit a physical random access preamble sequence, and the second resource is used to transmit a sounding reference signal.

603. The access network device sends information including the first resource to a first terminal device, and the access network device sends information including the second resource to a second terminal device.

It should be noted that the first terminal device and the second terminal device are terminal devices in a same cell. Optionally, the first terminal device and the second terminal device are different terminal devices. Optionally, the first terminal device and the second terminal device may alternatively be a same terminal device.

Optionally, the first terminal device determines the first resource based on the information including the first resource, and transmits a first signal in the first resource.

Optionally, the second terminal device determines the second resource based on the information including the second resource, and transmits a second signal in the second resource.

It should be noted that in all embodiments of this application, all indication information may be sent by the access network device to the terminal device by using physical layer signaling, Media Access Control layer signaling, or Radio Resource Control signaling. Optionally, all indication information may be sent by the access network device to the terminal device by using a current carrier or a non current carrier. This is not specifically limited herein.

Optionally, the terminal device may determine the first set based on the indication information sent by an access network device or predefined configuration.

In the signal transmission method provided in this embodiment of this application, the first terminal device may receive the information including the first resource, and the second terminal device may receive the information including the second resource. The first resource and the second resource are different frequency-domain resources, start time points of the first resource and the second resource in the time-domain are both a first time point, the first time point is a time point in the first set, and the first set includes at least two preset start time points used for signal transmission in one subframe. The first terminal device sends the first signal in the first resource from the first time point, and the second terminal device sends the second signal in the second resource from the first time point. In other words, when a signal is sent on an unlicensed spectrum resource, a send time point of the terminal device is not limited to that there is only one transmission opportunity in one subframe, instead, there may be a plurality of sending opportunities in one subframe. Therefore, this embodiment increases a signal sending opportunity. In other words, when a signal is sent on a channel in an unlicensed spectrum on the unlicensed spectrum resource, a signal sending probability is increased.

The foregoing describes the signal transmission method in the embodiments of this application, and the following describes the terminal device in the embodiments of this application.

Figure 8:
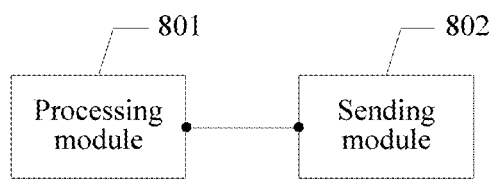
FIG. 8 is a schematic diagram of an embodiment of a terminal device according to an embodiment of this application.

Referring to FIG. 8, FIG. 8 shows an embodiment of a terminal device in this application. The terminal device includes a processing module 801 and a sending module 802.

The processing module 801 is configured to determine that permission to use a channel in an unlicensed spectrum is obtained at a first time point, where the first time point is any time point within a time window.

A start time point of the time window is a start time point of a symbol or is prior to the start time point of the symbol, an end time point of the time window is a second time point or is prior to the second time point, the second time point is within a time occupied by the symbol, the symbol is a symbol used to send a signal, the signal includes at least an actual cyclic prefix and an information segment, the actual cyclic prefix and the information segment are temporally continuous, the actual cyclic prefix is prior to the information segment, duration of the actual cyclic prefix is less than or equal to first duration of a preset cyclic prefix, and the first duration is a time length between the start time point of the symbol and the second time point.

The sending module 802 is configured to send the signal from the first time point.

It should be noted that with reference to the foregoing embodiment, for functions of or steps performed by the processing module 801 and the sending module 802, refer to corresponding processes in the foregoing method embodiment, and details are not described herein again.

Figure 9:
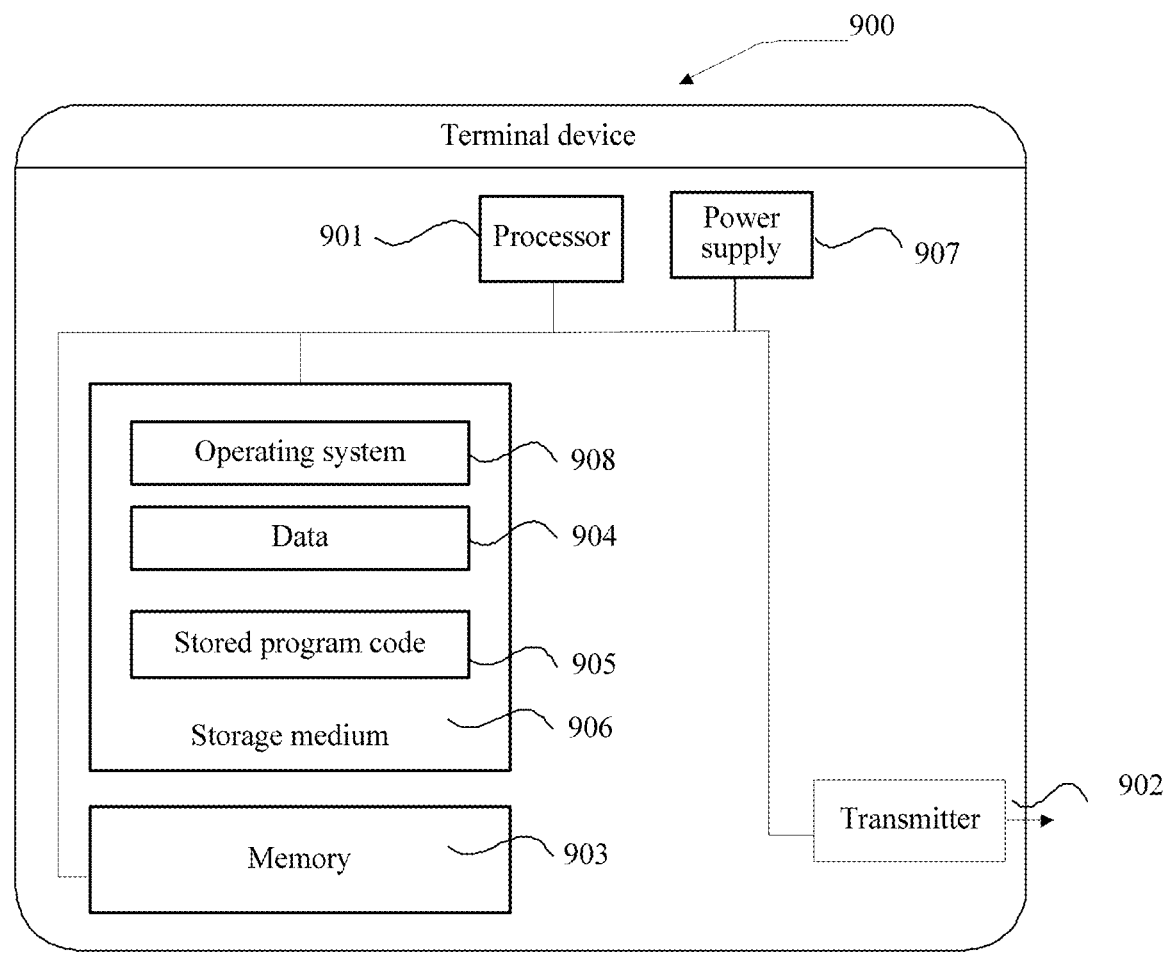
FIG. 9 is a schematic diagram of another embodiment of a terminal device according to an embodiment of this application.

The foregoing describes the terminal device in the embodiments of this application from the perspective of modular functions, and the following describes the terminal device in the embodiments of this application from the perspective of hardware processing. Referring to FIG. 9, FIG. 9 is a schematic structural diagram of a terminal device 900 according to an embodiment of this application. The terminal device 900 may be greatly different due to different configuration or performance. For example, the terminal device 900 may include one or more substantial processor 901 (for example, one or more processors) corresponding to the processing module in the foregoing embodiment, a substantial transmitter 902 corresponding to the sending module in the foregoing embodiment, a memory 903, and one or more storage mediums 906 (for example, one or more massive storage devices) storing data 904 or program code 905. The memory 903 and the storage medium 906 may be transient or persistent storages. The program stored in the storage medium 906 may include one or more modules (not shown in the figure), and each module may include a series of instruction operations of the terminal device. Still further, the central processing unit 901 may be configured to: communicate with the storage medium 906, and perform, on the terminal device 900, the series of instruction operations in the storage medium 906.

The terminal device 900 may further include one or more power supplies 907 and one or more operating systems 908.

In this embodiment of this application, the steps performed by the terminal device may be based on the schematic structural diagram of the terminal device shown in FIG. 8. For details, refer to a corresponding process in Embodiment 1, and details are not described herein again.

Figure 10:
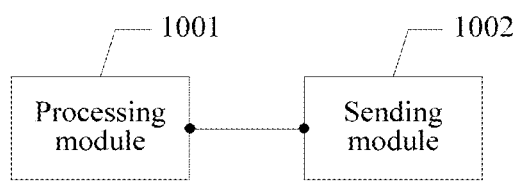
FIG. 10 is a schematic diagram of an embodiment of an access network device according to an embodiment of this application.

The foregoing describes the terminal device in the embodiments of this application, and the following describes the access network device in the embodiments of this application. Referring to FIG. 10, FIG. 10 is a schematic diagram of an embodiment of an access network device 1000 according to an embodiment of this application. The access network device 1000 includes a processing module 1001 and a sending module 1002.

The processing module 1001 is configured to determine indication information, where the indication information includes at least one of length information of a time window, start time point information of the time window, end time point information of the time window, start time point information of a symbol, second time point information, and first duration information.

The sending module 1002 is configured to send the indication information determined by the processing module 1001 to a terminal device, so that the terminal device determines the time window, the start time point information of the symbol, a second time point, or a preset cyclic prefix based on the indication information.

Figure 11:
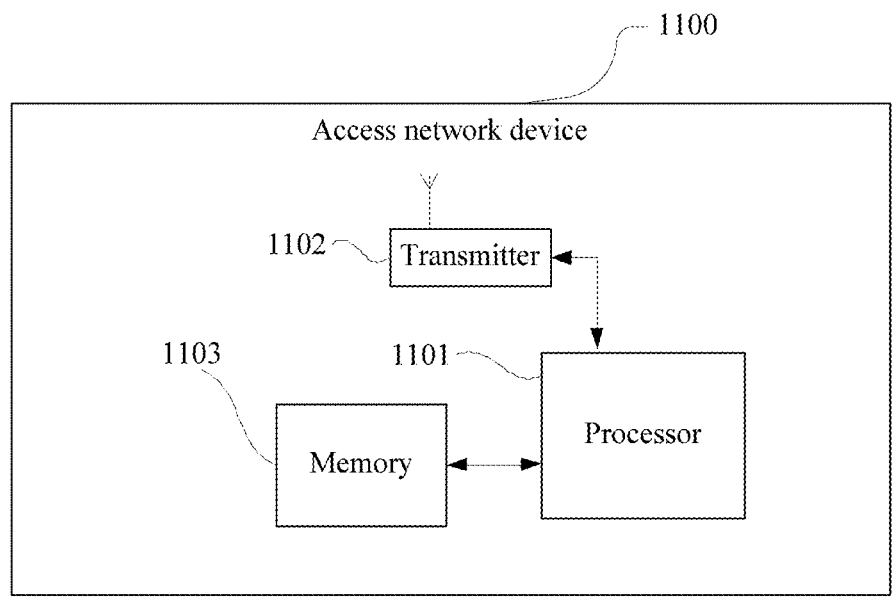
FIG. 11 is a schematic diagram of another embodiment of an access network device according to an embodiment of this application.

The foregoing describes the access network device in the embodiments of this application from the perspective of modular functions, and the following describes the access network device in the embodiments of this application from the perspective of hardware processing. As shown in FIG. 11, for the convenience of description, only a part related to the embodiments of this application is shown. For specific technical details not disclosed, refer to a method part corresponding to this embodiment of this application. Referring to FIG. 11, FIG. 11 is a schematic structural diagram of an access network device 1100 according to an embodiment of this application.

The access network device 1100 includes a substantial processor 1101 corresponding to the processing module 1001 and a substantial receiver 1102 corresponding to the sending module 1002 in the foregoing embodiment. The access network device 1100 further includes a memory 1103, configured to store program code. When the program code is executed by the processor 1101, the method in the embodiments of this application can be implemented. Persons skilled in the art may understand that the structure of the access network device shown in FIG. 11 does not constitute a limitation to the access network device, and may include more or fewer components than those shown in the figure, or some components may be combined, or different component arrangements may be used.

In this embodiment, the steps performed by the access network device may be based on the schematic structural diagram of the access network device shown in FIG. 10. For details, refer to a corresponding process in the foregoing embodiment, and details are not described herein again.

Figure 12:
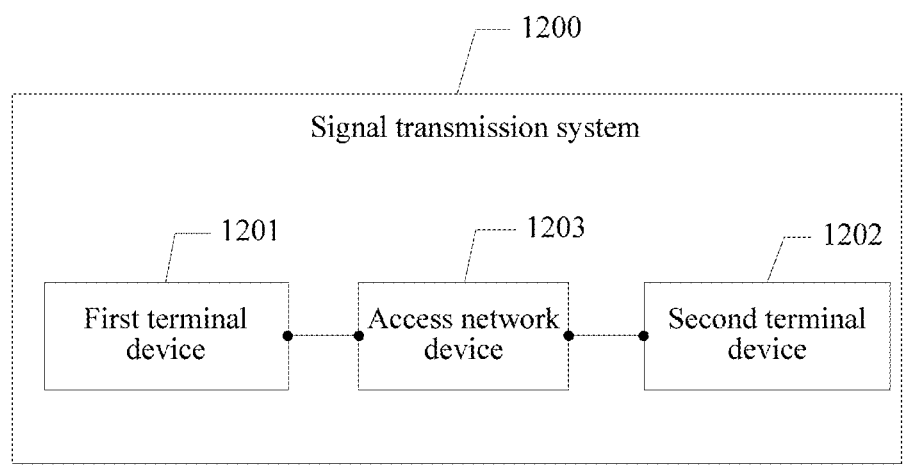
FIG. 12 is a schematic diagram of an embodiment of a signal transmission system according to an embodiment of this application.

The foregoing separately describes the terminal device and the base station in the embodiments of this application. The following describes a signal transmission system including a terminal device and a base station. Referring to FIG. 12, FIG. 12 is a schematic diagram of an embodiment of a signal transmission system 1200 according to an embodiment of this application.

The signal transmission system 1200 includes a first terminal device 1201, a second terminal device 1202, and an access network device 1203.

The access network device 1203 is specifically configured to:
determine a first set, where the first set includes at least two preset start time points for signal transmission in one subframe;
determine a first resource and a second resource, where the first resource and the second resource are different frequency-domain resources, start time points of the first resource and the second resource in a time domain are both a first time point, and the first time point is a time point in the first set; and
send information including the first resource to the first terminal device 1201, and send information including the second resource to the second terminal device 1202.

The first terminal device 1201 is configured to: receive the information including the first resource, and send a first signal in the first resource from the first time point.

The second terminal device 1202 is configured to: receive the information including the second resource, and send a second signal in the second resource from the first time point.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It should be noted that the processor in the apparatus embodiment may be a central processing unit (CPU), a network processor (NP), or a combination of a CPU and an NP. The processor may further include a hardware chip. The hardware chip may be specifically an application-specific integrated circuit (ASIC), a programmable logic device (PLD), or a combination thereof. In addition, the PLD may be a complex programmable logic device (CPLD), a field-programmable gate array (FPGA), a generic array logic (GAL), or any combination thereof. This is not limited in the present invention.

In the several embodiments provided in this application, it should be understood that the disclosed system, module, and method may be implemented in other manners. For example, the described apparatus embodiment is merely exemplary. For example, the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional modules in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated module is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A signal transmission method, comprising:
determining, by a terminal device, that permission to use a channel in an unlicensed spectrum is obtained at a first time point, wherein the first time point is any time point within a time window after a preset start time of a preset cyclic prefix of a symbol, wherein
a start time point of the time window is a start time point of the symbol or is prior to the start time point of the symbol, an end time point of the time window is a second time point or is prior to the second time point, the second time point is within a time occupied by the symbol, the symbol is a symbol used to send a signal, the signal comprises at least an actual cyclic prefix and an information segment, the actual cyclic prefix and the information segment are temporally continuous, the actual cyclic prefix is prior to the information segment, a first duration of the actual cyclic prefix is less than a preset duration of a preset cyclic prefix when the actual cyclic prefix starts at the first time point after the preset start time point of the preset cyclic prefix of the symbol, and the first duration of the actual cyclic prefix is greater than the preset duration of the preset cyclic prefix when the actual cyclic prefix starts at the first time point being before the preset start time point of the present cyclic prefix of the symbol, the first duration is a time length between the start time point of the symbol and the second time point, wherein the duration of the actual cyclic prefix is less than the first duration and greater than or equal to a second duration, wherein the second duration is greater than or equal to a sum of maximum round-trip duration of signal transmission time between an edge terminal device in a cell of the terminal device and an access network device and a maximum channel delay spread; and sending, by the terminal device, the signal from the first time point.

2. The signal transmission method according to claim 1, wherein
the sending, by the terminal device, the signal from the first time point comprises:
sending, by the terminal device, the actual cyclic prefix of the signal from the first time point to the second time point; and
sending, by the terminal device, the information segment of the signal from the second time point.

3. The signal transmission method according to claim 2, wherein before the determining, by a terminal device, that permission to use a channel in an unlicensed spectrum is obtained at a first time point, the method further comprises:
determining, by the terminal device, the second duration based on indication information sent by the access network device or predefined configuration.

4. The signal transmission method according to claim 1, wherein the duration of the actual cyclic prefix is equal to the first duration;
the symbol comprises guard duration; and
the end time point of the time window is prior to the second time point, duration between the start time point of the symbol and the end time point of the time window is equal to third duration, and the third duration is less than a smaller value in the first duration and the guard duration.

5. The signal transmission method according to claim 4, wherein the method further comprises:
determining, by the terminal device, information about duration between the start time point of the symbol and the first time point; and
sending, by the terminal device, the duration information to an access network device.

6. The signal transmission method according to claim 4, wherein before the determining, by a terminal device, that permission to use a channel in an unlicensed spectrum is obtained at a first time point, the method further comprises:
determining, by the terminal device, the third duration based on indication information sent by the access network device or predefined configuration.

7. The signal transmission method according to claim 1, wherein before the determining, by a terminal device, that permission to use a channel in an unlicensed spectrum is obtained at a first time point, the method further comprises:
determining, by the terminal device, at least one piece of the following information based on the indication information sent by the access network device or the predefined configuration:
a length of the time window;
the start time point of the time window;
the end time point of the time window;
the start time point of the symbol;
the second time point; and
the first duration.

8. The signal transmission method according to claim 1, wherein the signal is a physical random access preamble sequence in a Long Term Evolution (LTE) system; and
a format of the physical random access preamble sequence is format 0, format 1, format 2, format 3, or format 4.

9. The signal transmission method according to claim 1, wherein a time length from an end time point of the time window to the second time point is the second duration.

10. A terminal device, comprising:
one or more processors configured to determine that permission to use a channel in an unlicensed spectrum is obtained at a first time point, wherein the first time point is any time point within a time window after a preset start time of a preset cyclic prefix of a symbol, wherein
a start time point of the time window is a start time point of a symbol or is prior to the start time point of the symbol, an end time point of the time window is a second time point or is prior to the second time point, the second time point is within a time occupied by the symbol, the symbol is a symbol used to send a signal, the signal comprises at least an actual cyclic prefix and an information segment, the actual cyclic prefix and the information segment are temporally continuous, the actual cyclic prefix is prior to the information segment, a first duration of the actual cyclic prefix is less than a preset duration of a preset cyclic prefix when the actual cyclic prefix starts at the first time point after the preset start time point of the preset cyclic prefix of the symbol, and the first duration of the actual cyclic prefix is greater than the preset duration of the preset cyclic prefix when the actual cyclic prefix starts at the first time point being before the preset start time point of the present cyclic prefix of the symbol, the first duration is a time length between the start time point of the symbol and the second time point, wherein the duration of the actual cyclic prefix is less than the first duration and greater than or equal to a second duration, wherein the second duration is greater than or equal to a sum of maximum round-trip duration of signal transmission time between an edge terminal device in a cell of the terminal device and an access network device and a maximum channel delay spread; and
a transmitter configured to send the signal from the first time point.

11. The terminal device according to claim 10, wherein the transmitter is configured to:
send the actual cyclic prefix of the signal from the first time point to the second time point; and
send the information segment of the signal from the second time point.

12. The terminal device according to claim 11, wherein the one or more processors are further configured to:
  determine the second duration based on indication information sent by the access network device or predefined configuration.

13. The terminal device according to claim 10, wherein the duration of the actual cyclic prefix is equal to the first duration;
  the symbol comprises guard duration; and
  the end time point of the time window is prior to the second time point, duration between the start time point of the symbol and the end time point of the time window is equal to third duration, and the third duration is less than a smaller value in the first duration and the guard duration.

14. The terminal device according to claim 13, wherein the one or more processors are further configured to
  determine information about duration between the start time point of the symbol and the first time point; and
  the transmitter is further configured to send the duration information to the access network device.

15. The terminal device according to claim 13, wherein the one or more processors are further configured to:
  determine the third duration based on indication information sent by the access network device or predefined configuration.

16. The terminal device according to claim 10, wherein the one or more processors are further configured to:
  determine at least one piece of the following information based on the indication information sent by the access network device or the predefined configuration:
  a length of the time window;
  the start time point of the time window;
  the end time point of the time window;
  the start time point of the symbol;
  the second time point; and
  the first duration.

17. An access network device, comprising:
  one or more processors configured to determine indication information, wherein the indication information comprises at least one of length information of a time window, start time point information of the time window, end time point information of the time window, start time point information of a symbol, second time point information, first duration information, and second duration information; and
  a transmitter configured to send the indication information determined by the one or more processors to a terminal device, so that the terminal device determines the time window, the start time point information of the symbol, a second time point, or a preset cyclic prefix based on the indication information, wherein the sending of the indication information causes the terminal device to determine a first duration of an actual cyclic prefix the terminal device uses when sending information using the access network device, and wherein the first duration is determined to be less than a preset duration of a preset cyclic prefix of the symbol when the actual cyclic prefix starts at a first time point after a preset start time point of a preset cyclic prefix, and the first duration of the actual cyclic prefix is greater than the preset duration of the preset cyclic prefix of the symbol when the actual cyclic prefix starts at the first time point being before the preset start time point of the present cyclic prefix, the first duration is a time length between a start time point of a symbol and a second time point at the end of the symbol, wherein the duration of the actual cyclic prefix is less than the first duration and greater than or equal to the second duration, wherein the second duration is greater than or equal to a sum of maximum round-trip duration of signal transmission time between an edge terminal device in a cell of the terminal device and the access network device and a maximum channel delay spread.

18. The access network device according to claim 17, wherein the indication information further comprises second duration information or third duration information.

19. A non-transitory computer readable storage medium having instructions stored thereon, which when executed by at least one processor of a terminal device, causes the at least one processor to perform one or more operations of a signal transmission method, the one or more operations comprising:
  determining that permission to use a channel in an unlicensed spectrum is obtained at a first time point, wherein the first time point is any time point within a time window after a preset start time of a preset cyclic prefix of a symbol, wherein
  a start time point of the time window is a start time point of a symbol or is prior to the start time point of the symbol, an end time point of the time window is a second time point or is prior to the second time point, the second time point is within a time occupied by the symbol, the symbol is a symbol used to send a signal, the signal comprises at least an actual cyclic prefix and an information segment, the actual cyclic prefix and the information segment are temporally continuous, the actual cyclic prefix is prior to the information segment, a first duration of the actual cyclic prefix is less than a preset duration of a preset cyclic prefix when the actual cyclic prefix starts at the first time point after the preset start time point of the preset cyclic prefix of the symbol, and the first duration of the actual cyclic prefix is greater than the preset duration of the preset cyclic prefix when the actual cyclic prefix starts at the first time point being before the preset start time point of the present cyclic prefix of the symbol, the first duration is a time length between the start time point of the symbol and the second time point, wherein the duration of the actual cyclic prefix is less than the first duration and greater than or equal to a second duration, wherein the second duration is greater than or equal to a sum of maximum round-trip duration of signal transmission time between an edge terminal device in a cell of the terminal device and an access network device and a maximum channel delay spread; and
  sending the signal from the first time point.

* * * * *